(12) United States Patent
Zauderer

(10) Patent No.: US 7,435,400 B2
(45) Date of Patent: Oct. 14, 2008

(54) OPTIMIZING POST-COMBUSTION NITROGEN OXIDE AND SULFUR DIOXIDE REDUCTIONS AND IMPROVING COMBUSTION EFFICIENCY IN COAL FIRED BOILERS

(76) Inventor: Bert Zauderer, 275 N. Highland Ave., Merion Station, PA (US) 19066

( * ) Notice: Subject to any disclaimer, the term of this patent is extended or adjusted under 35 U.S.C. 154(b) by 58 days.

(21) Appl. No.: 11/668,929

(22) Filed: Jan. 30, 2007

(65) Prior Publication Data
US 2007/0180835 A1  Aug. 9, 2007

Related U.S. Application Data

(60) Provisional application No. 60/765,716, filed on Feb. 7, 2006, provisional application No. 60/786,372, filed on Mar. 28, 2006, provisional application No. 60/744,294, filed on Apr. 5, 2006.

(51) Int. Cl.
| | |
|---|---|
| B01D 53/34 | (2006.01) |
| B01D 53/50 | (2006.01) |
| B01D 53/56 | (2006.01) |
| B01D 53/62 | (2006.01) |
| B01D 53/74 | (2006.01) |
| B01D 53/76 | (2006.01) |
| F23B 90/00 | (2006.01) |
| F23J 15/00 | (2006.01) |

(52) U.S. Cl. .................... 423/210; 423/215.5; 423/220; 423/235; 423/244.07; 423/244.08; 110/203; 110/215; 110/216; 110/341; 110/342; 110/345; 431/2

(58) Field of Classification Search ................. 110/203, 110/215, 216, 341, 342, 345; 423/210, 235, 423/244.07, 244.08, 215.5, 220; 431/2
See application file for complete search history.

(56) References Cited

U.S. PATENT DOCUMENTS

| | | | |
|---|---|---|---|
| 6,048,510 A | 4/2000 | Zauderer | |
| 6,453,830 B1 | 9/2002 | Zauderer | |
| 6,722,295 B2 | 4/2004 | Zauderer | |
| 2002/0061271 A1* | 5/2002 | Zauderer | ............... 423/243.08 |
| 2005/0000220 A1* | 1/2005 | Zauderer | ..................... 60/775 |

OTHER PUBLICATIONS

EPA Air Pollution Control Manual, 6th Edition, Ch. 1, Fig. 1.3, pp. 1-7 (EPA/452/B-02-001), Jan. 2002.
"NOx Control Program Addresses CAIR", in "Clean Coal Today", DOE/FE-0486, Issue No. 63, Summer 2005, pp. 1 and 5.
EPA Web Site: http://cfpub.epa.gov/gdm/index.cfm?fuseaction=emissions.wizard, downloaded Jan. 26, 2007.
EPA Web Site: http://www.epa.gov/airmarkets/emissions/prelimarp/index.html, downloaded Jan. 26, 2007.
Selective Catalytic Reduction (SCR) Technology for the Control of Nitrogen Oxide Emissions from Coal Fired Boilers—DOE Topical Report No. 23, May 2005, p. 18.
"Terra, Urea & Urea Solution, Storage, Handling and Dilution", Copyright 2004-2005, revised Dec. 2006, Terra Industries Inc. p. 1-10.

* cited by examiner

*Primary Examiner*—Timothy C Vanoy
(74) *Attorney, Agent, or Firm*—Greenblum & Bernstein, P.L.C.

(57) ABSTRACT

A method for increasing the nitrogen oxide emissions by either removing or modifying fuel rich nitrogen oxide ($NO_x$) reduction processes thereby improving combustion efficiencies especially with low volatile low sulfur coals, and remove unburned carbon, reduce sulfur dioxide and reducing carbon dioxide emissions, while using post-primary combustion urea or ammonia injection with or without a reburn fuel $NO_x$ reducing process to restore $NO_x$ to regulated emission levels. Furthermore, adding lime or limestone to the urea or ammonia solution to further reduce $SO_2$ and to increase the concentration of the carbon free fly ash to cementitious concentrations. Furthermore, by proper number and disposition of the injectors in the post combustion zone and by further water diluting the mixture, this $NO_x$ reduction process is effective at substantially higher gas temperatures than conventional Selective Non-Catalytic $NO_x$ Reduction and with no ammonia slip. This method significantly increases the profitability of power plants.

30 Claims, 8 Drawing Sheets

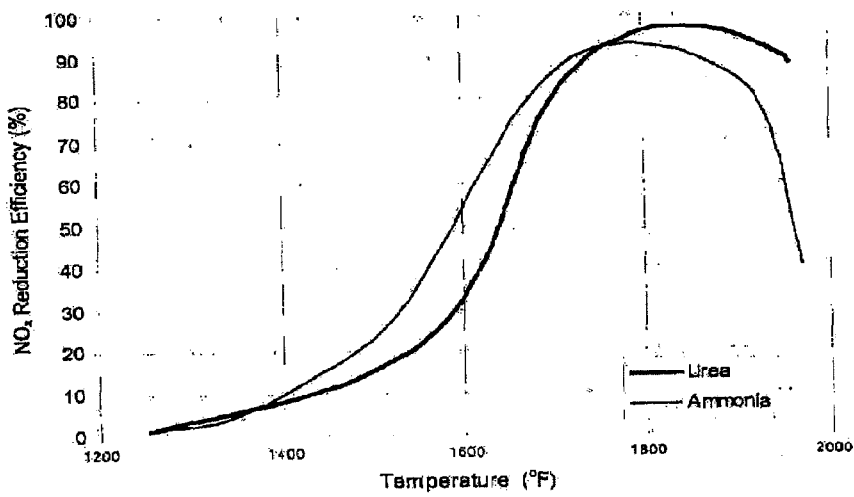
Figure 1. Effect of Temperature on NO$_x$ Reduction
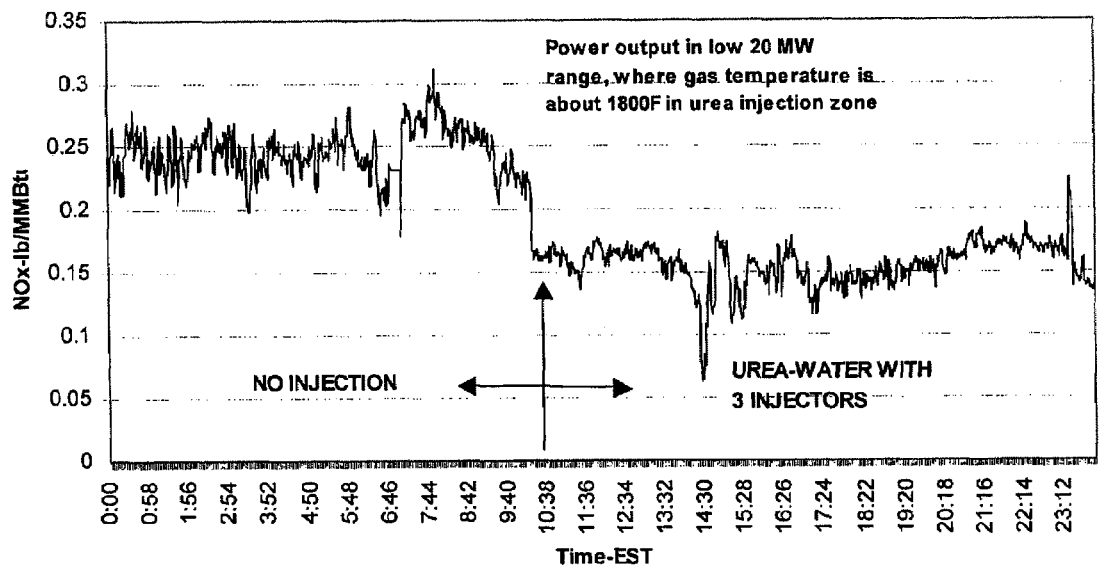
FIG. 2: NOx without & with urea injection in 50 MW Boiler

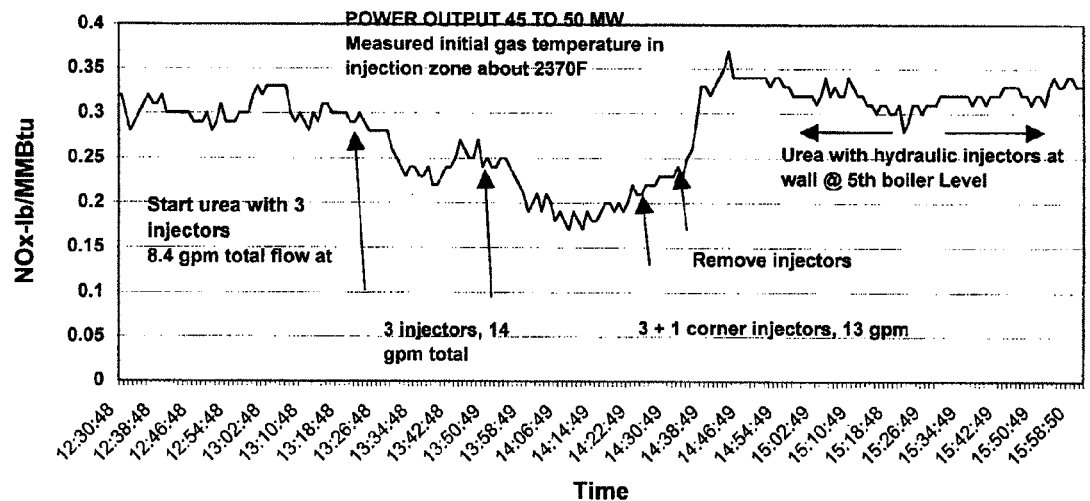
FIGURE 3: NOx Reduction with urea injection,
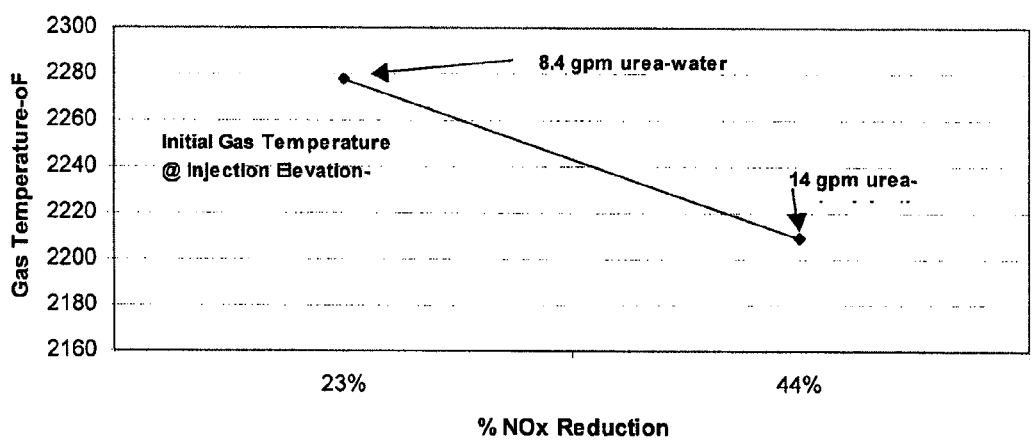
FIGURE 4: Gas Cooling Effect on NOx Reduction with Increasing water urea-solution Flow in 50 MW Boiler

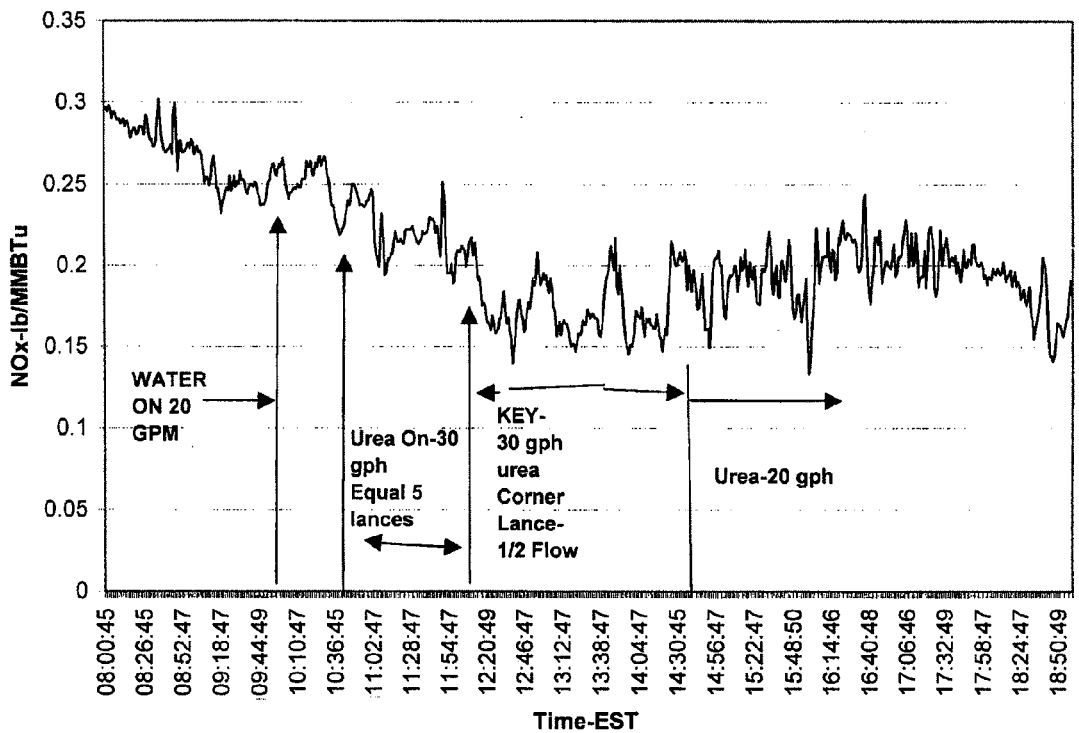
Figure 5: 50 MW Plant : NOx-with Urea-water & 19 gpm in 5 injectors @ 42 to 43 MW
KEY Result- 3 Side @ 4.7 gpm & 2 Corner injectors @ 2.5 gpm
High water flow rate in injector spray dominates NOx reduction
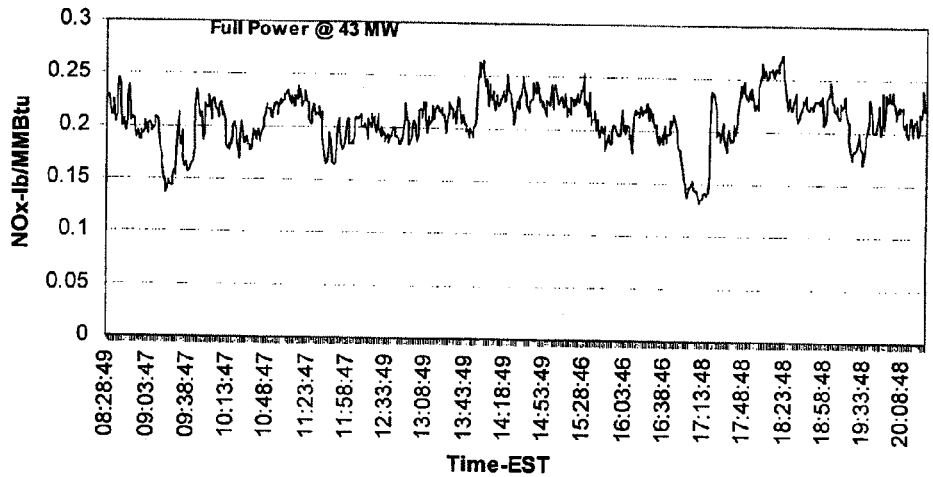
Figure 6: 50 MW Power Plant NOx with Water- Urea Injection
5 injectors, 2.8 gpm each-Total 14 gpm,
Key result: Lower flow per injector, less NOx reduction

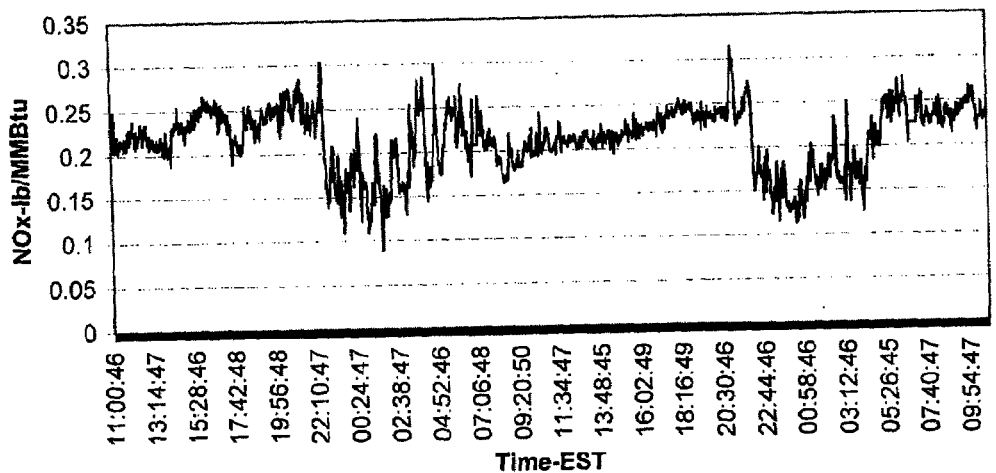
Figure 7: 50 MW Plant; 18 Ammonia Slip Tests with water-urea injection:
@ 26 MW- 8 gpm, @ 36 MW -10 gpm, @ 43 MW-12.5 gpm
NH3 Spltp <0.5 ppm
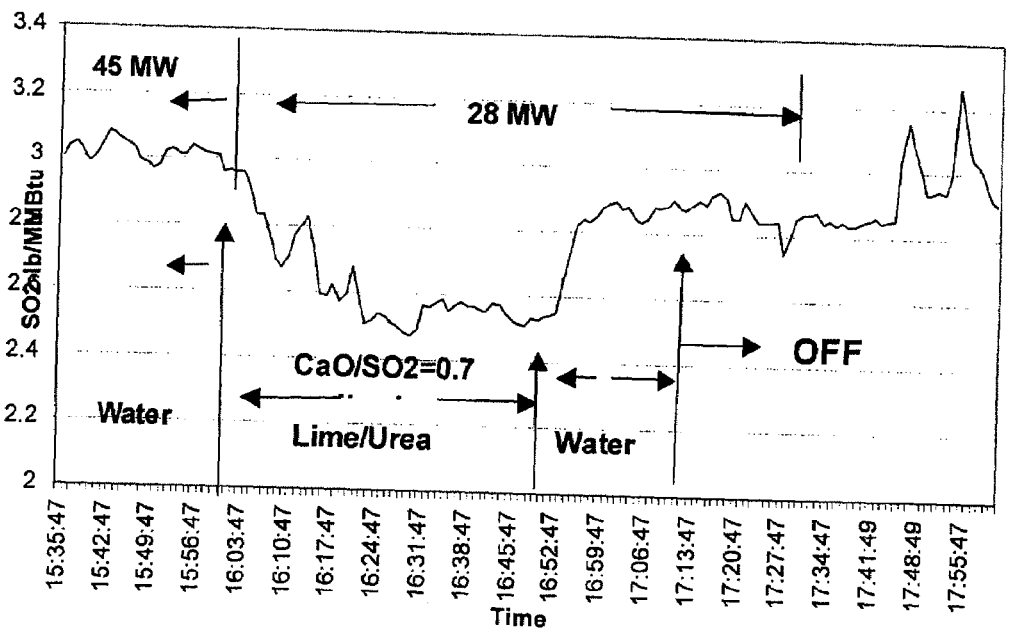
Figure 8: 50 MW Plant -Combined Lime/Urea Injection test at low power-11/15/2005

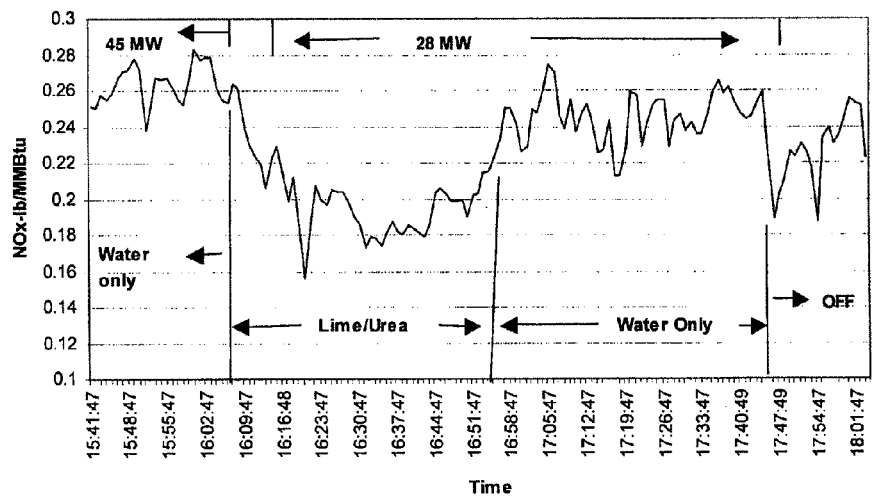
Figure 9: 50 MW Power Plant-Combined SO2/NOx at Same Date & Power as Fig. 8
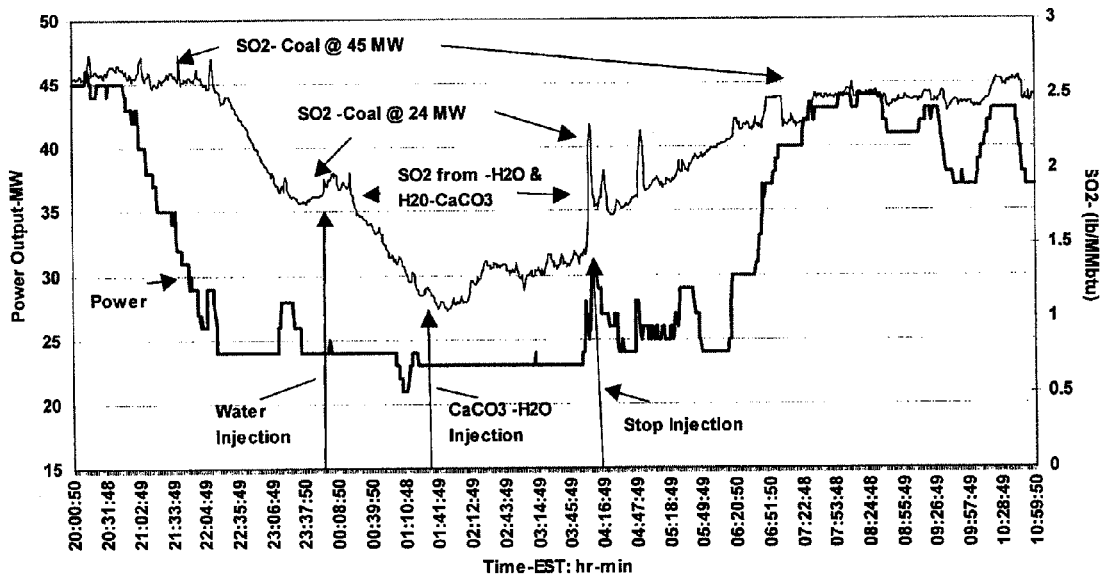
Figure 10: SO2 & Power Output- 50 MW Plant Test

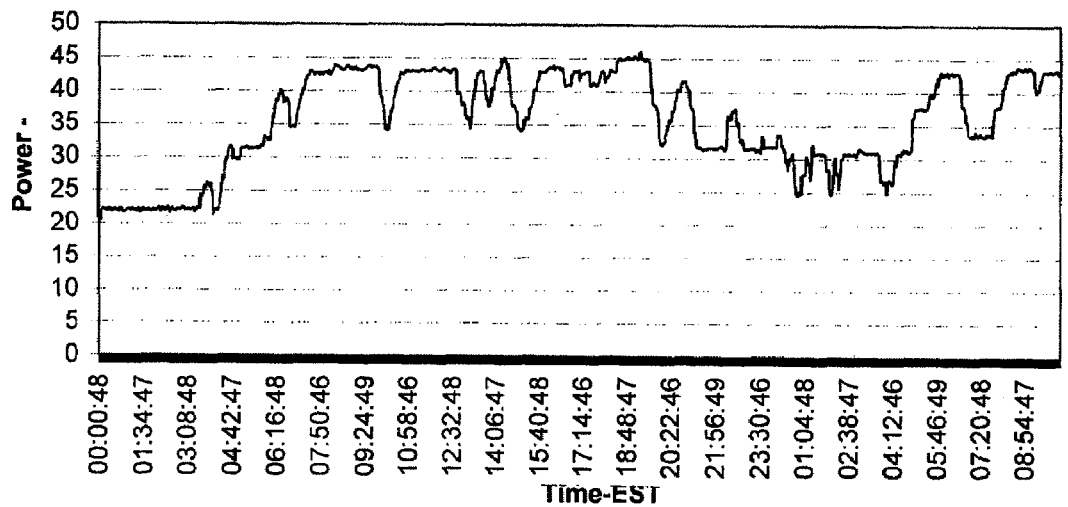
Figure 11 : 50 MW Power Plant- Power Output- 34 hours from 00:00 hr
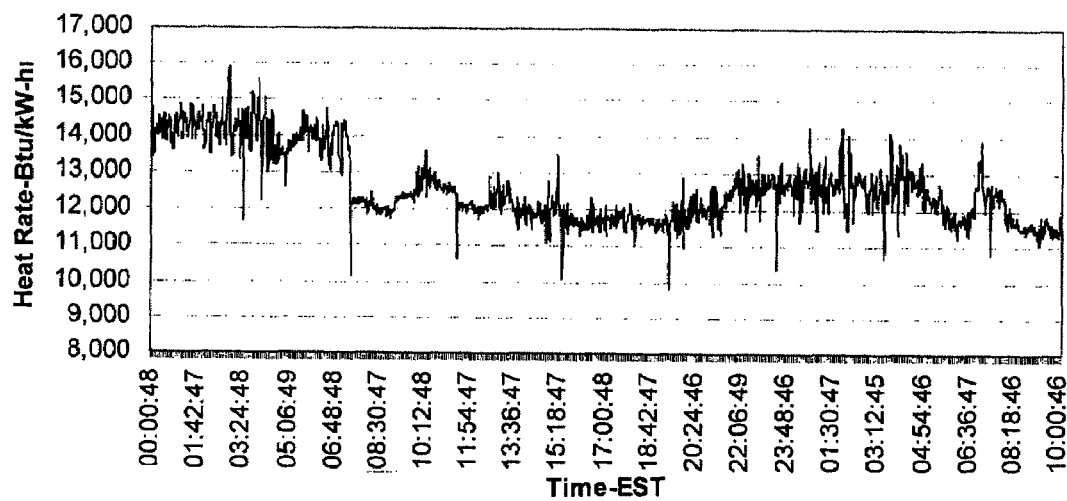
Figure 12: 50 MW Power Plant - Heat Rate on same date as Fig.11

FIGURE 13: 50 MW Coal Power Plant-
SO2 (12 month) & NOx (5 month summer Ozone)
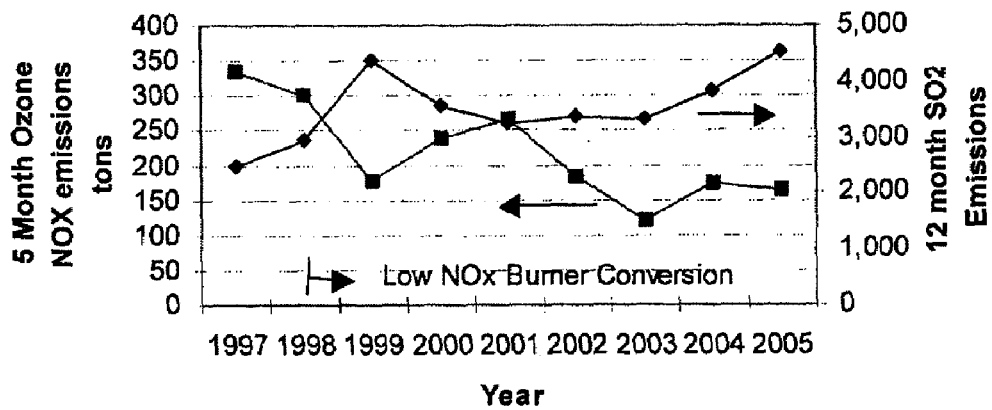
FIGURE 14: 50 MW Coal Power Plant-
Percentage Change in Annual SO2 & NOx Emissions
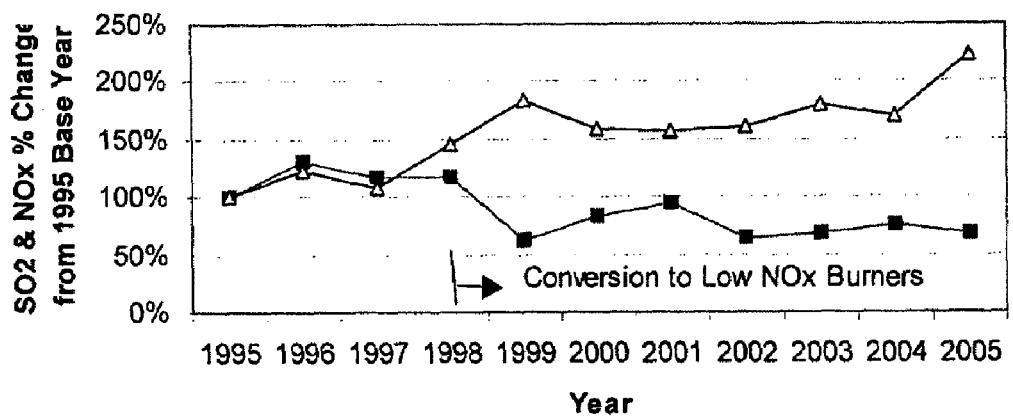

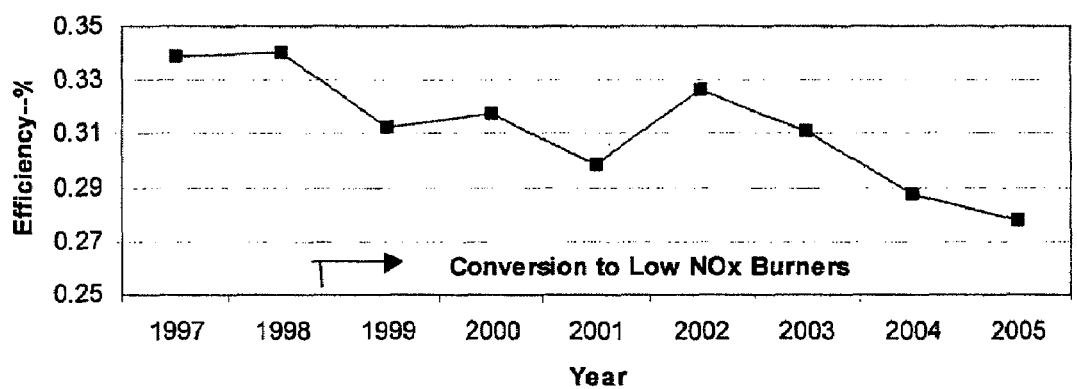
FIGURE 15: 50 MW Coal Power Plant Efficiency

OPTIMIZING POST-COMBUSTION NITROGEN OXIDE AND SULFUR DIOXIDE REDUCTIONS AND IMPROVING COMBUSTION EFFICIENCY IN COAL FIRED BOILERS

CROSS REFERENCE TO RELATED APPLICATIONS

The present application claims priority to U.S. Provisional Application Ser. No. 60/765,716, filed Feb. 7, 2006, U.S. Provisional Application Ser. No. 60/786,372, filed Mar. 28, 2006, and U.S. Provisional Application Ser. No. 60/744,294, filed Apr. 5, 2006, the contents of which are all incorporated by reference in their entireties herein.

BACKGROUND OF THE INVENTION

1. Field of the Invention

The present invention generally relates to improvements in methods by which coal fired boilers, especially boilers in existing electric power generation plants, can operate to economically reduce the emissions of nitrogen oxides ($NO_x$) by means of Selective Non-Catalytic Reduction (SNCR), which is effected by injection of urea or ammonia-water droplets of varying size into a high temperature, post combustion zone in the boilers, either by-itself, or in combination with the reduction of sulfur dioxide ($SO_2$) by the co-injection of reducing agents, such as lime or limestone in the injection lances utilized for the SNCR process.

2. Description of Relevant Art

U.S. Pat. No. 6,048,510, Dated: Apr. 11, 2000, U.S. Pat. No. 6,453,830 B1, Dated: Sep. 24, 2002, and U.S. Pat. No. 6,722,295 B2, Dated: Apr. 20, 2004 are hereby incorporated by reference in their entireties. When Congress enacted the Clean Air Act in the 1970's existing coal fired power plants where exempt from new emission controls under a "grandfather" clause based on the assumption that they would soon be shut down. Only "routine maintenance" was allowed, which not surprisingly initiated decades long legal challenges as to the meaning of "routine maintenance". The effect of this was that few, if any, new coal fired power plants that would have to meet stringent emission standards were erected.

There currently exists a problem which is faced by many existing domestic and overseas power plants whose size and age precludes economic retrofit with very high $NO_x$ reduction processes, such as Selective Catalytic Reduction (SCR) and very high $SO_2$ reduction processes, such as wet or dry scrubber, both of which have very high installed capital costs. By way of example, according to the Department of Energy (DOE), this category of boilers applies to 66% of U.S. coal fired power plants. The boilers are under 300 MW in size and on average 15 years old. To allow these boilers to continue operating in the face of increasingly stringent $SO_2$ and $NO_x$ emission standards, the U.S. Environmental Protection Agency (EPA) has introduced trading in emission credits, whereby an emitter of $NO_x$ and $SO_2$ whose emissions exceed the annual regulatory specified emission "allowances" can purchase in the open market emission credits from an emitter whose emission are below the standards.

Instead as power demand increased by the 1990's combined with utility deregulation, non-utility investors, called merchant power developers, began to erect natural gas fired, combined gas turbine-steam turbine power plants as well as gas turbine peaking plants. They were much lower in capital cost, could be erected rapidly and natural gas was only a few dollars per million Btu. Equally important was the negligible emissions of $SO_2$ from the natural gas fired power plants and their very low emissions of $NO_x$. As a result, high emission coal fired power plants could purchase emission "credits" on the open market at low cost, with $SO_2$ available at under $200 per ton and $NO_x$ for under $1,000 per ton.

Apparently overlooked by merchant power developers was that relying on natural gas, a relatively scarce commodity in the U.S., would inevitably lead to higher prices. This indeed occurred during the California electricity crisis of 1999-2000, with the price of natural gas spiking to $10/MMBtu from its historical $2/Mmbtu. At $10/MMBtu, the fuel alone for a very high, 50% efficient gas-fired combined cycle plant is about $70/MW, plus the substantial amortization cost of new power plants as well as their operating costs. This compares to the historical nominal $20/MW off-peak power and about double that for on-peak power prices from old coal fired power plants. While peaking gas turbines could operate during hours of peak demand, such as during hot summer days when prices spike into the $100's/MW, combined cycle gas fired plants cannot be cycled daily to and from shutdown. As the price of natural gas remained at ever increasing prices, peaking at $15/MMBtu in late 2005, even some of the largest owners of the new gas fired power plants were forced into bankruptcy.

Coal fired power plants were beneficiaries of reduced output from gas fired power plants. However, in 2003 EPA introduced more stringent $NO_x$ and $SO_2$ emission standards. The new ceiling on $NO_x$ emissions is 0.15 lb/MMBtu. As a result, the price of $NO_x$ emission spiked to $6,000 per ton in 2003, and it has remained in the $2000 to $3000/per ton range until the end of 2006, and then decreasing to about $1000. Also, $SO_2$ emission credits, which had remained at near historic levels of less than $200/ton, in part due to the increased use of low sulfur coal in the East and low sulfur Western coal shipped to the Mid-West, began to increase to the $600 to $700 per ton range in 2004 as the price of these coals began to increase. By late 2005, the price of $SO_2$ spiked to $1,600 per ton, presumably in anticipation of more stringent EPA emission standards. In 2006 it has decreased to the $500 range possibly to the large number of banked $SO_2$ credits coming on the market. One lesson to a power plant operator is to assure that these sudden and wide market fluctuations do not result in operating losses.

One option for existing coal fired power plants is to add $SO_2$ stack scrubbers and $NO_x$ Selective Catalytic Reduction (SCR) systems that can meet the current stringent standards. While activity in this area has increased, it is not a solution to many coal fired power plants because their high (at least $70/kW each) capital cost carries the risk adding long-term fixed costs to old power plants, which would make these plants unprofitable if electricity prices were to decline during the amortized life of this pollution control equipment.

U.S. Pat. Nos. 6,048,510 and 6,722,295 (which are hereby incorporated by reference in their entireties) were utilized in practicing the above patents. U.S. Pat. No. 6,048,510 discloses methods to reduce $NO_x$ in the post-combustion zone of coal fired utility boilers by injecting droplets of varying size, consisting of urea dissolved in water, at the outer edge of a gas zone and dispersing them throughout the gas zone where the gas temperatures are in the range of 1700° F. to 2100° F. that is conducive to $NO_x$ reduction. U.S. Pat. No. 6,722,295 discloses a method of using the same equipment as in U.S. Pat. No. 6,048,510 patent and adding to the water-urea solution, very fine lime or limestone particles that are dispersed in the droplets for the purpose of simultaneously reducing both $NO_x$ and $SO_2$.

The research and development that led to the $NO_x$ and $SO_2$ patents (U.S. Pat. Nos. 6,048,510 and 6,722,295, respectively,) was implemented primarily during testing in the post-combustion zone of a 20 MMBtu/hour coal combustor-package boiler facility shown schematically in FIG. 1 in each of the two patents, as described in detail in the patents. The patents summarize test results in the boiler in which peak $SO_2$ reductions in the 80% range were obtained by injection of droplets of lime or finely ground limestone dispersed in water. Also, $NO_x$ reductions of up to 80% were measured in the boiler with droplets of ammonia-water solutions and somewhat lesser amounts with urea-water solutions.

SUMMARY OF THE PRESENT INVENTION

One solution to the financial risk of high capital cost emission control technology is low capital cost $NO_x$ and $SO_2$ control processes, which is available by practicing the present invention. The cost is almost totally in consumables. Therefore, the use of the present invention allows a coal fired power plant to operate economically even if these control methods are used only for a few hours daily. The present invention teaches by example how this low capital cost was practiced in a 50 MW coal fired power plant.

The present invention can also be practiced on new boiler installations because their capital costs are substantially lower than existing control systems for the pollutants. However, the present invention primarily offers a solution to a problem faced by many existing domestic and overseas power plants whose size and age precludes economic retrofit with very high $NO_x$ reduction processes, such as Selective Catalytic Reduction (SCR) and very high $SO_2$ reduction processes, such as wet or dry scrubber, both of which have very high installed capital costs. According to the Department of Energy (DOE) (Reference 2), this category of boilers applies to 66% of U.S. coal fired power plants. The boilers are under 300 MW in size and on average 15 years old. To allow these boilers to continue operating in the face of increasingly stringent $SO_2$ and $NO_x$ emission standards, the U.S. Environmental Protection Agency (EPA) has introduced trading in emission credits, whereby an emitter of $NO_x$ and $SO_2$ whose emissions exceed the annual regulatory specified emission "allowances" can purchase in the open market emission credits from an emitter whose emission are below the standards.

One feature of the present invention is the very low cost of the equipment, which is in the range of several dollars per kilowatt at electric utility power plant sizes. This minimizes the financial risk of sunk capital should environmental emission regulations become more stringent and make these processes unsuitable. The equipment includes the injection lances, the emission reduction reagent, compressed air delivery systems, and the reagent storage system. Most of the controls and diagnostics necessary are generally already installed in a power plant's control and continuous emission recording systems.

U.S. Pat. No. 6,048,510 and U.S. Pat. No. 6,722,295 contain results of several tests of up to several hours in duration that were conducted in 1997 on a 37 MW and a 100 MW coal fired utility boilers. In the 37 Mw boiler, 40% $NO_x$ reduction from an initial 1 lb/MMBtu was measured. In 1999 and 2000, tests in the post-combustion zone were conducted at another power plant's 50 MW coal-fired boiler. $NO_x$ reductions ranging from 23% to 38% with a urea-water solution were measured. Three injectors were inserted into the three sides of the boiler wall.

One reason for the lesser reductions in these power plant tests compared to those in the 20 MMBtu/hr boiler is due to incomplete dispersion of the reagent droplets across the combustion gas cross-section at the gas temperatures of about 1700° F. to 2100° F. where these processes are effective. To test this hypothesis in reducing the present invention to practice the number of injectors was increased by adding two injectors to each corner of the boiler, for a total of five injectors at the same boiler elevation. When $NO_x$ reduction tests were resumed, it was found that inserting the two additional injector lances in the corners of the boiler was quite difficult and several of the designs used either could not be inserted or were ineffective as most of the droplet spray impacted the boiler walls. Furthermore, it was discovered that adding injector lances was necessary but insufficient to effect improved $NO_x$ reductions. As disclosed in detail in the present invention lowering the gas temperature in the injection zone to the range at which $NO_x$ reduction is effective was much more productive than the number of injection lances.

Also as described in the $SO_2$ patent, short duration tests of about 1 hour duration were also conducted with the combined $SO_2$ and $NO_x$ process on the 50 MW boiler. Mixtures consisting of 22% by weight of lime in a 5.6% urea-72.4% water solution were injected. As with the $NO_x$ tests, three injectors were inserted several feet into the gas flow on the three sides of the upper furnace section, upstream of the superheaters, where the gas temperatures ranged from 1800° F. when the boiler operated at half load to 2400° F. when it operated full load. At a calcium-sulfur mol ratio of 0.54, the $SO_2$ reduction was only 7%. At a Ca/S ratio of about 1, the reduction was 20%. These low reductions were attributed in part to calcium/sulfur mol ratios being much lower than the range of 2 to 3 used in the 20 MMBtu/hr boiler tests. Also, it was believed that adding two more corner injectors would improve the reagent utilization by intercepting a larger cross-section. This was one of the objectives in practicing the present invention.

The present invention concerns improvements in the methods and procedures that are disclosed in U.S. Pat. No. 6,048,510 and U.S. Pat. No. 6,722,295. The present invention is a result of improvements made in the reduction of $NO_x$ and $SO_2$ emissions during the practice of U.S. Pat. No. 6,048,510 and No. 6,722,295 B2 by proceeding from short (nominal one hour long) operations on a 37 MW, 100 MW and 50 MW coal fired power plant boilers to continuous month-long, round the clock operation on the 50 MW boiler. The improvements, which had the impact on the practicing of these two emission control processes, are as follows, realizing that there is no particular order of importance.

$1^{st}$ ASPECT

The present invention increases the water flow rate in the injectors by further diluting the urea-water solution in order to cool the combustion gases upstream of the superheaters to the temperature range of about 1700° F. to 2100° F. at which the $NO_x$ and $SO_2$ reducing reactions are effective.

In large industrial and in utility scale boilers the effective temperature range at which the emission reductions are favored is primarily in the superheater section, which is a confined gas zone with closely spaced steam pipes. As a result, a significant fraction of the injected reagent droplets impact the pipes and fail to react with the combustion gases. The preferred injection region is in the open upper boiler furnace region immediately upstream of the superheater section. At part load boiler operation, the gas temperatures are in the proper range. However, at full load they exceed that range. In tests in the 50 MW boiler, it was found that increasing the total water flow rate in the injector lances and thereby cool the combustion gases to the temperature range where the $NO_x$ reducing reaction with urea is effective substantially increased the $NO_x$ reduction. However, the full importance of this water flow increase in practicing Selective Non-Catalytic Reduction of $NO_x$ was not recognized until after several months of near continuous operation of this SNCR $NO_x$ process on the 50 MW boiler.

Prior literature on the SNCR processes as well as the teachings in U.S. Pat. No. 6,048,510 suggest injecting urea or ammonia solutions in the region where the gas temperature is within the prescribed range of about 1700° F. to 2100° F. at which the SNCR process is effective, namely in the superheater tube sections or at various levels in the furnace section upstream of the superheater. In the latter case, multiple levels of injectors are indicated depending on the load on the boiler. However, due to the constricted space between the steam pipes in the superheater section, such teaching is inefficient. Furthermore, placing injectors at various levels in the open furnace section, as thought by prior art cited in the patent, requires costly multiple penetrations in the boiler wall for inserting the injectors.

On the other hand, the current invention teaches that by increasing the water flow rate in the injectors a cooler gas temperature zone can be created where the SNCR reaction is effective irrespective of all boiler loads. Initially it was assumed that injecting more water would reduce the power output of the 50 MW plant by 1 to 2 MW, which is a costly revenue loss during peak power periods when prices spike to $100's/MW.

A means to offset this revenue loss was first recognized during tests to identify the cause for the initial reduction of $NO_x$ at part load that occurred at the start of urea-water injection, followed almost immediately (within minutes) by an increase in $NO_x$ as urea injection continued. The power output is controlled from the peak steam pressure. The reason for this $NO_x$ pattern is due to the operation of the boiler. As the power output decreased due the combustion gas cooling from the water spray, the steam pressure decreased, and this caused the coal feed rate to automatically increase in order to offset the drop in steam pressure. This added coal increased fuel bound nitrogen to the combustion gases, which in turn increased $NO_x$. Therefore, the cost of lost power from water injection was not in cost of lost megawatts but in the much lower cost of the added coal. The 50 MW power plant uses very low cost coal for up to about 50% of total output. Therefore, it was computed that the costs of the added coal and all the urea was less than the potential revenue gain from the sale of $NO_x$ emission credits. However, for this particular 50 MW plant it may not be possible to add more coal when operating at full load due to capacity limits in the coal mills. As a result, the lost 1 to 2 MW power at full power cannot be offset with more coal. However, it should be possible to modify the operation of this plant. In any case, this limitation may not exist in other power plants.

$2^{nd}$ ASPECT

The present invention contemplates cooling of the combustion gases to the temperature range at which the $NO_x$ and $SO_2$ reductions are effective depends on the local gas conditions in the droplet injection zone, not on the total water injection rate. This feature of the present invention was discovered in tests at the same total water flow rate with three injectors and with five injectors. Higher $NO_x$ reductions were measured with the three injectors than with the five injectors because the water flow per injectors was greater with three injectors than with five injectors in these tests. However, increasing the water flow to all five injectors to the same higher level than in each of the three injectors resulted in higher $NO_x$ reduction with the five injectors than with the three injectors.

$3^{rd}$ ASPECT

The effectiveness, efficiency and economics of $NO_x$ reduction by urea are critically dependent on the form of urea supplied and on the urea-water solution preparation method. Commercially prepared aqueous solutions of 30% or 50% urea are used for $NO_x$ control with the SCR and SCNR processes in power plants. However, shipping water is costly, especially at high fuel costs. The alternative of using agricultural grade urea is substantially lower in cost. However, in preparing urea-water solutions it was discovered that dissolving urea in water is a very strong endothermic reaction, a fact that was not disclosed verbally or in the literature of suppliers of urea-water solutions. In the present invention, a 5 gallon water pail with water at ambient 70° F. was mixed with 30% of urea by weight and the water temperature decreased to near freezing within 30 seconds. The solution energy was measured at 80 to 90 Btu/lb of urea, which means that to prepare a 50%-50% urea-water solution requires preheating the water to about 140° F. in order to prevent precipitating urea above 30% by weight. Therefore to prepare 50% solutions the low grade heat from the plant, such as low pressure steam should be used to pre-heat the water.

$4^{th}$ ASPECT

The present invention contemplates that multi-stage, high-pressure pumps should be used to mix and dilute high urea concentrations in water solutions with high pressure, dilution water for pumping the combined diluted solution from ground level storage tanks to the injectors high in the upper furnace section of the boiler. The total liquid flow rate is determined by the amount of water needed to cool the combustion gases in the injection zone to the range at which the SNCR reaction is effective.

$5^{th}$ ASPECT

The present invention contemplates procedures to assure high $NO_x$ reduction with minimum urea utilization and negligible ammonia slip. In reducing the invention to practice using the steps described in the previous four improvements, as well as others described in the detailed description of this invention, over 40% $NO_x$ reductions were achieved with essentially near zero ammonia slip and with urea utilization that was a small fraction of prices for $NO_x$ emission credits in the several years prior to 2006.

$6^{th}$ ASPECT

The present invention contemplates that emissions should be expressed in lbs per MW-hour, not lb per MMBtu. Emissions of $NO_x$ are set by government agencies in terms of pounds per million Btu. However, power plants sell electricity not BTUs. Generally power plants have lower heat rates at part load than at full load. As a result, the $NO_x$ emissions at part load in pounds per megawatt can be higher at part load compared to full load than the comparable values when expressed in pounds per million Btu. This distinction was not initially recognized in the 50 MW $NO_x$ reduction tests because some results expressed in terms of pounds per million Btu indicated modest $NO_x$ reductions, when in fact they were quite substantial.

7th ASPECT

The present invention contemplates combined $NO_x$ and $SO_2$ reduction by injection of lime or limestone mixtures in urea-water solutions. The process described in U.S. Pat. No. 6,722,205 was further reduced to practice in the present invention by testing in the 50 MW coal-fired boiler. The new finding was the need to insert sufficient injectors to intercept the gas flow containing $SO_2$ molecules in the temperature range at which the $SO_2$ reducing reaction with calcium oxide is effective, namely about 1800° F. and 2200° F. It was also demonstrated that finely ground (less than 10 microns in mean diameter) limestone is as effective as lime particles, both dispersed in water, in reducing $SO_2$ provided that the gas temperature at which the limestone is injected is at least about 2000° F. or higher. At lower gas temperatures the limestone does not calcine effectively, despite its calcination temperature of about 1650° F. Lime, on the other hand, calcines at several 100 degrees Fahrenheit lower temperature and it can be injected in the entire gas temperature range at which both the $NO_x$ and $SO_2$ reactions are effective. Also, the same equipment can be used to prepare and deliver the lime or limestone to the injectors as is used for the $NO_x$ reduction.

The above aspects clearly derive from the Provisional Application No. 60/765,716.

8th ASPECT

The features presented in this improvement are clearly derived from Provisional Application No. 60/786,372. The present invention contemplates that by increasing $NO_x$ by burning the coal at less fuel rich conditions and using the patented SNCR and Reburn $NO_x$ processes to return to low $NO_x$ emissions, and replacing high volatile, high sulfur coal with low volatile, low sulfur coal to reduce $SO_2$ emissions, it is possible to increase combustion efficiency and reduce $CO_2$ emissions. The 50 MW power plant uses very fuel rich combustion followed by overfire air to reduce $NO_x$ to about 0.3 lb/MMBtu. Since the boiler has the same design and manufacturer as the 37 MW boiler used in U.S. Pat. No. 6,048,510 cited herein, it is almost certain that at one time this boiler operated fuel lean with $NO_x$ emissions of 1 lb/MMBtu, as was the case in the 37 MW unit. The uncontrolled $NO_x$ was before EPA's power plant emissions data was put on the Web because in 1997 the 50 MW plant had some fuel rich combustion as its $NO_x$ was about 0.5 lb/MMBtu. Then in 1998 additional reductions with fuel rich combustion and overfire air conversion was implemented. Incredibly as will be shown in the "Detailed Description" this conversion resulted in major unburned carbon in the fly ash of 15%, which renders this ash of minimal value. Much worse, to achieve these low $NO_x$ levels, the low volatile, very high (20% to 30%) ash coal that this boiler can burn efficiently had to be reduced to about one-half load and the balance supplemented with high volatile, high sulfur bituminous coal. The result was that while $NO_x$ has been reduced by 160 tons during the 5-month summer ozone season from 1997 to 2005, $SO_2$ has increased an incredible 2,500 tons a year in that period. In suppressing one pollutant a worse pollutant increased.

It is contemplated herein to return the main coal burners to near or full unity stoichiometry, and use most if not all of the low cost, low sulfur, high ash coal for most if not all combustion. Then use the technology of SNCR (U.S. Pat. No. 6,048, 510) process, and the Reburn (U.S. Pat. No. 6,453,830 B1) process, if needed, to return the $NO_x$ to the previous or lower state. This will increase combustion efficiency, sharply cut $SO_2$, reduce $CO_2$ and reduce unburned carbon.

9th ASPECT

The features presented in this improvement are clearly derived from Provisional Application No. 60/744,294. The present invention contemplates optimizing the coal fuel mix, the combustion, and the $SO_2$ and $NO_x$ control processes to improve the operation of a coal fired power plant operating in the load following mode as dictated by the electric grid. The invention discloses means by which the combustion non-uniformities that are caused by different coal feed rate to the various burners can be balanced by adding small coal mills, small auxiliary coal burners, changing the coal type mix, and withdrawing and inserting the $NO_x$ and $SO_2$ control injectors in order to maximize electricity revenue

EMBODIMENTS

A method for complete combustion of a carbonaceous fuel, low volatile matter, low sulfur coal, in a primary combustion zone of a boiler or furnace operating at about 3000° F. gas temperature and near to or at stoichiometric condition of unity in order to increase combustion efficiency and nitrogen oxide, $NO_x$, concentrations, while reducing carbon dioxide, $CO_2$, and sulfur dioxide, $SO_2$, concentrations in the primary combustion zone below levels attainable with more fuel rich combustion and higher sulfur coal, comprising: identifying a post-primary combustion zone within the boiler or furnace having gas temperatures between about 1700° F. to 2500° F.; injecting an aqueous urea or ammonia solution as dispersed air atomized droplets of varying diameters across a planar spray pattern perpendicular to gas flow direction for reducing $NO_x$ to at least 0.3 lb/MMBtu; if required to augment the aqueous urea or ammonia solution to achieve the reduction of the $NO_x$, injecting in the post-primary combustion zone, a solid or liquid carbonaceous fuel to convert by reburn gases to local fuel rich conditions, followed by injection of additional air into a post reburn combustion zone to return the gases to excess air conditions; and adjusting water concentration in the aqueous urea or ammonia solution to levels that are high enough to cool the gases to about 2100° F. to 2200° F. or below in order to enable urea or ammonia-$NO_x$ reaction to function at temperatures for effective post combustion $NO_x$ reducing reactions.

The aqueous urea or ammonia solution is mixed with lime or limestone particles that are less than about 10 microns in diameter and which are injected as air atomized droplets of varying size with injectors into the post-combustion zone to further reduce $SO_2$. The calcium to sulfur mol ratio is increased to as much as 3 to maximize the $SO_2$ reduction, to increase calcium oxide, CaO, concentration in fly ash entrained in combustion gases flowing through the boiler or furnace to exit into an ash collection location. The CaO in the CaO fly ash mixture is between about 20% and 40% of mixture weight.

The method further includes providing water flow to reduce gas temperature to a range of about 1700° F. to 2100° F. at which $NO_x$ and $SO_2$ reducing reactions are effective, and using sufficient injectors so that a total planar droplet spray emanating from the injectors covers at least most of the $NO_x$ and $SO_2$ reducing gas temperature zone. The reburn fuel to reduce $NO_x$ in a gas temperature zone between about 1700° F. and 2500° F. is injected in addition to the aqueous urea or ammonia solution, and a predetermined number of injectors are used to cover an entire reburn combustion zone. The method further comprises using only lime when combustion gas temperature in a lime or limestone injection zone is below about 2000° F.

The optimization of the $NO_x$ reduction is given priority to minimize $NO_x$ in pounds per megawatt over pounds per million Btu. When the urea is dry granular bulk form, it is prepared by solution in storage tanks, and the solution does not exceed about 30% if the water is at ambient temperature or about 50% when the water is pre-heated to about 140° F., with low grade water or steam from the boiler to prevent solid urea precipitation of highly endothermic urea-water reaction. The lime or limestone that comprises particles less than 10 micrometers in diameter is prepared in a storage tank in a concentration that does not exceed about 30% by weight and the urea concentration in a water-lime or water-limestone mixture does not exceed relative mol ratios for effective reduction of $SO_2$ and of $NO_x$.

The high concentration aqueous solutions of the urea or ammonia are pumped with high pressure, multi-stage centrifugal pumps and diluted with high pressure water at ground level and pumped to injectors inserted into walls of the boiler or furnace at elevations in a range of about 100 feet by high pressure, multi-stage centrifugal pumps. The high concentration aqueous solutions of the urea and lime or limestone are pumped with high pressure, multi-stage centrifugal pumps and diluted with high pressure water at ground level and pumped to injectors inserted into walls of the boiler or furnace at elevations in a range of about 100 feet by high pressure, multi-stage centrifugal pumps, and insertion and removal of the injectors from inside high temperature furnace gases are preceded with water only flushing to prevent the lime or limestone from drying and blocking injector air or water passages. The flow rate in each injector controls a required flow rate of the aqueous urea or ammonia solution needed to cool the gases in a $NO_x$ reducing injection zone.

The injection of water dilution flow rate into the boiler or furnace lowers a power output, and additional coal or other fuel is delivered to primary combustors to restore power output with fuel selection made with a lowest cost fuel to minimize economic cost of emission reduction. The injectors are automatically removed from the furnace or boiler during periods when a price of produced energy or electricity overrides an economic benefit from $NO_x$, $SO_2$ and $CO_2$ reductions. When existing fuel delivery systems have insufficient capacity to replace power loss due to $NO_x$ or $SO_2$ processes, auxiliary low cost coal crushers and burners with capacity to process replacement fuel are used, and in case combustion efficiency and $NO_x$ and $SO_2$ productions are adversely affected by uneven fuel distribution, additional burners are used to even heat input per burner by controls including $O_2$ sensors to optimize burner operation. Under no circumstances are injector heads from which $NO_x$ reducing urea or ammonia reaction are inserted at gas temperatures where a reducing reaction is effective to be placed at locations where the gas temperature is below a lowest level where the reaction is effective to prevent ammonia slip.

The method further includes removing injectors when utility capacity and electricity prices are above predetermined levels, and reinserting the injectors when utility capacity and electricity prices return to or below the predetermined levels. The method further includes inserting thermocouples for predetermined periods of time to measure temperature in the boiler or furnace, and withdrawing the thermocouples after the predetermined amount of time to prevent rapid destruction in an ash and slag laden hot gas environment of the boiler or furnace. The method further includes using infrared detectors for temperature measurement of the boiler or furnace and correcting readings therefrom for a level of water injected by the injectors.

Evaluating cost effectiveness of $SO_2$ and $NO_x$ and $CO_2$ reduction processes includes considering factors that impact power plant performance and efficiency, and further comprising by returning the boiler or furnace to its pre-fuel rich combustion $NO_x$ control operation by modifying or removing low $NO_x$ burners and overfire air and increasing $NO_x$ emissions to pre-regulation levels results in efficient combustion with low cost, low volatile, low sulfur coals with no unburned carbon loss, and using the steps of claim 1 to restore higher $NO_x$ to current regulation level. EPA emission data for U.S. power plants and furnaces are reported regularly to seek out facilities that benefit by using the steps of claim 1 to restore boiler furnace operation to pre-emission regulation levels.

The method further includes injecting the aqueous urea or ammonia solution, with or without reburn in the solution injection zone, to reduce $NO_x$ to at least 0.15 lb/MMBtu. Positive displacement high pressure pumps are used in addition or instead of the multi-stage centrifugal pumps. $NO_x$ emission credits are purchased for a difference between a $NO_x$ emission level resulting from the urea or ammonia injection and the $NO_x$ level required for full regulatory emission compliance. The ash-calcium oxide mixture is a cementitious marketable product.

A method, comprising: identifying a post-primary combustion zone within the boiler or furnace; injecting an aqueous urea or ammonia solution as dispersed air atomized droplets of varying diameters across a planar spray pattern perpendicular to gas flow direction for reducing $NO_x$; injecting, a solid or liquid carbonaceous fuel to convert by reburn gases to local fuel rich conditions, followed by injection of air into a post combustion zone to return gases to excess air conditions; and adjusting water concentration in the aqueous urea or ammonia solution to levels that are high enough to cool the gases in order to enable urea or ammonia-NOx reaction to function at temperatures for effective post combustion $NO_x$ reducing reactions.

The method further comprising at least one of: using low volatile, low sulfur coal to reduce $SO_2$ emissions; injecting lime or limestone to further reduce $SO_2$ emissions; injecting sufficient limestone to increase a concentration of calcium oxide in emitted coal fly ash to increase its concentration to 20% or more by weight of the ash-limestone mixture; selling excess $SO_2$, $NO_x$, and $CO_2$ reductions beyond levels needed for regulatory compliance; selling cementitious ash-CaO mixture; and operating the power plant in either load following or fixed power output.

BRIEF DESCRIPTION OF THE DRAWINGS

The following and other aspects and advantages will be better understood from the following detailed description of the preferred embodiments of the invention with reference to the drawings, in which FIG. 1 shows the effect of combustion gas temperature on $NO_x$ reduction with urea or ammonia;

FIG. 2 shows $NO_x$ without and with urea injection in the 50 MW Boiler;

FIG. 3 shows $NO_x$ reduction with urea injection for various number of injectors and various total urea-water solution flow to said injectors;

FIG. 4 shows the Estimated Gas Cooling from Increasing the Water concentration in the injected urea-water solution vs $NO_x$ Reduction in the 50 MW Boiler;

FIG. 5 shows for the 50 MW Power Plant's $NO_x$-level with urea-water solution flow of 19 gpm with five injectors at different urea and solution flow to the injector;

FIG. 6 shows the 50 MW Power Plant's $NO_x$ Emissions with less total water-urea solution injection per injector than in FIG. 5

FIG. 7 shows the 50 MW Plant's $NO_x$ Emissions with water-urea injection at three power level and injection flow water that were used to measure ammonia slip;

FIG. 8 shows the 50 MW Plant's $SO_2$ reduction in a Combined Lime/Urea-Water Injection test at low power of 28 MW;

FIG. 9 shows the 50 MW Power Plant's $NO_x$ emissions for the same test as in FIG. 8.

FIG. 10 shows the $SO_2$ and Power Output-with water only and with a water-limestone mixture in a 50 MW Power Plant Test;

FIG. 11 shows the 50 MW Power Plant-Power Output in two days of load following operation;

FIG. 12 shows the 50 MW Power Plants's Heat Rate over the same period as in FIG. 11;

FIG. 13 shows the 50 MW Coal Power Plant's $SO_2$ (12 month) & $NO_x$ (5 month summer Ozone; Season Emissions annually) from 1997 through 2005

FIG. 14 shows the 50 MW Coal Power Plant's Percentage Change in Annual $SO_2$ and $NO_x$ Emissions through 2005 as a percentage change from a 1997 baseline FIG. 15 shows the 50 MW Coal Power Plant Efficiency decrease from 1997 through 2005.

DETAILED DESCRIPTION OF THE EMBODIMENTS OF THE INVENTION

The present invention is a result of improvements in the reduction of $NO_x$ and $SO_2$ emissions that were made subsequent to U.S. Pat. Nos. 6,048,510, 6,453,830 and 6,722,295 B2. These improvements were conceived and tested in the course of testing on a 20 MMBtu per hour coal combustor test facility that is described in such patents, as well as a considerable number brief one day tests on a 50 MW coal fired utility power plant boiler, followed by round-the clock tests of the $NO_x$ SNCR process, and a brief combined subsequent test to reduce $NO_x$ and $SO_2$. The following sections describe the improvements and innovations that were made, as contemplated by the invention.

INCREASING THE WATER FLOW RATE IN THE INJECTORS IN ORDER TO COOL THE COMBUSTION GASES TO TEMPERATURES AT WHICH THE $NO_x$ AND $SO_2$ REDUCING REACTIONS ARE EFFECTIVE

Urea or ammonia reduces $NO_x$ and lime or limestone reduces $SO_2$ in coal combustion gases in a temperature range of about 1700° F. to 2100° F., as shown for $NO_x$ in FIG. 1, taken from the EPA Report. As disclosed in the patents, this temperature range is found inside the superheater section of boilers when they operate near or at full power. However, the confined spacing between steam carrying pipes in the superheater impedes the distribution of water droplets containing the reagents. U.S. Pat. No. 6,048,510, disclosed one attempt with one injector into the superheater section in the 100 MW boiler in 1997 that yielded no $NO_x$ reduction. This temperature range is also found in the open furnace section, upstream of the superheater, primarily at part load operation, and injection of dispersed water droplets containing the reagent have been found in tests on a 50 MW boiler to be very effective in achieving reductions in the two pollutants under part load conditions.

FIG. 2 shows the $NO_x$ results when the 50 MW rated boiler operated for 2 days at an average of 22 MW, or one-half full summer load of 45 MW. With urea injection, through three injector lances on the three sidewalls of the boiler, $NO_x$ was reduced by an average of 40%. The variations are due to the use of different blends of coal with different fuel bound nitrogen levels, which is the primary source of $NO_x$. At this half load, the gas temperatures in the urea injection zone have been measured at about 1800° F.

At full load the gas temperatures in this open furnace region have been measured as high as 2400° F., where the $NO_x$ and $SO_2$ reducing reactions should reverse. However, by increasing the water mass flow rate of the droplets, without increasing the reagent concentration, it was found that the gas temperature at about three-quarters to full power output in the boiler was reduced to the temperature range where reducing reactions are effective.

FIG. 3 shows this in a full load, 45 to 50 MW, test of over 1 hour duration where increasing the total solution flow rate to 14 gpm (namely 4.7 gpm per injector), clearly increased the $NO_x$ reduction to the 40% range. FIG. 3 triggered the four month test, as described herein. Also shown in this figure is the addition of a $4^{th}$ injector at the corner of the boiler that sprayed most of its droplets into the wall at the corner of the boiler and resulted in less $NO_x$ reduction because the flow per injector was reduced.

COOLING OF THE COMBUSTION GASES TO THE TEMPERATURE RANGE AT WHICH THE $NO_x$ AND $SO_2$ REDUCTIONS ARE EFFECTIVE DEPENDS ON THE LOCAL GAS TEMPERATURE IN THE DROPLET INJECTION ZONE, NOT ON THE TOTAL WATER INJECTION RATE.

FIG. 4 shows the calculated reduction in the measured combustion gas temperature in the urea injection zone versus the % $NO_x$ reduction. This clearly shows that as the gases are cooled to the upper temperature range where the urea-$NO_x$ reduction reaction is optimum, the $NO_x$ reduction increases. This calculation was made for the estimated cross-sectional area intercepted by the flat fan spray from the injectors, and not the total cross-sectional area of the furnace at the injection plane.

FIGS. 5 and 6 prove that the spray area, and not the total water flow across the furnace cross-section, is to be used in the calculating the SNCR effectiveness in these tests that were conducted at full power with the gas temperatures of about 2400° F. The $NO_x$ reduction in FIG. 5 is with five injectors at 19 gpm total flow, three injectors on the sidewalls and two in the corner. Each had 3.8 gpm between 11:00 and 12:30 EST and $NO_x$ was reduced to the range of 0.25 to about 0.22 lb/MMBtu. For the next two hours, the flow to the three side injectors was increased to 4.7 gpm, while it was cut to 2.5 gpm to each of the two corner injectors, and $NO_x$ decreased to about 0.17 lb/MMBtu. This confirms the importance of the water flow rate at full load where the gas temperatures are about 2400° F., about 300° F. above the optimum SNCR limit.

FIG. 6 shows even better the importance of the water flow to each injector. Here only 2.8 gpm was the equal water flow to each of five injectors and $NO_x$ was reduced only to 0.2 lb/MMBtu due to reduced cooling in each of the injection spray patterns. This shows that high $NO_x$ reduction depends on injecting sufficient water to drive the local gas temperature in the area intercepted by the spray to the range at which the urea-$NO_x$ reaction is optimum.

FIG. 3 shows another result. Between 15:00 and 16:00 hours the same urea-water solution was injected through a series of hydraulic nozzles located in the wall at one level below that of the air atomized flat fan spray injectors that protruded into the gas stream. No reduction in $NO_x$ resulted from these hydraulic injectors proving that the urea-water spray was wasted in the region near the cooler wall and in the hotter gas region at this lower level in the boiler. In addition, it almost certainly resulted in some ammonia slip. This is an important result because prior art in SNCR use wall injectors at various elevations each of which comes into use as the gas temperature reaches the effective urea-$NO_x$ reaction at that injection elevation level. Other SNCR practitioners mix proprietary additives with the urea-water solution that lowers the effective temperature at which the SNCR reaction is effective.

However, the use of high water flow rates reduced the power output of the 50 MW plant at full load by 1 to 2 MW. One would assume that this would negate the economic benefit of $NO_x$ reduction at full load, especially in the summer when at periods of peak power demand electricity prices can escalate to many $100's per MW from a range of $50/MW. However, the data collected during continuous operation of the urea-$NO_x$ reduction tests revealed that the power loss greatly overestimates the cost of the added water injection because power demand in this boiler is controlled by the peak steam pressure. As power decreases due to the added water injection, the coal supply of the primary burners is increased to offset the power loss. Therefore, the actual cost of the power loss is that of the added coal whose cost, especially in the 50 MW plant that uses very low cost high ash coal, is a small fraction of the cost of the lost power production. At part load the cost of the coal and the urea is much less than the market price of $NO_x$ emission credits.

However, the 50 MW boiler operates so that at full load more coal cannot be added due to coal mill limits, and indeed the loss of 1 to 2 MW costs at full load as much as the price of electricity. However, the coal mill capacity can be increased by combustion under fuel lean conditions as in the early 1990's. This will increase the $NO_x$ in the combustion zone, and SNCR and Reburn is then used to restore the low $NO_x$. as explained herein. Currently, the boiler achieves 0.3 lb/MMBtu of $NO_x$ with fuel rich combustion in the primary coal burners. This yields very high 15% unburned carbon loss. Operating under fuel lean conditions will remove the unburned carbon, and the higher the air flow can lower the gas temperature in the urea injection zone. Then increasing the urea flow will return $NO_x$ to its current levels and lower, and if needed reburn can be used for additional $NO_x$ reduction. The boiler will then operate under conditions that maximize the emission reductions while minimizing the loss of power from water injection as well as reducing fuel loss due to unburned carbon. This procedure can apply to different boiler designs and ratings, and each boiler must be optimized to minimize $NO_x$ production.

THE EFFECTIVENESS, EFFICIENCY AND ECONOMICS OF $NO_x$ REDUCTION BY UREA ARE CRITICALLY DEPENDENT ON THE FORM OF UREA SUPPLIED AND ON THE UREA-WATER SOLUTION PREPARATION.

With bulk urea costs of about $330/ton in mid-2005, the price of agricultural urea in 50 lb bags, supplied in 1 ton pallets was $432/ton, while urea-water solutions supplied by tanker truck in 50%/50% mixtures was $568/ton, which included transportation costs at about 100 miles. In addition, the storage tanks at the power plant must remain at about 70° F. to prevent the purchased aqueous 50% urea from precipitating. At 30% urea, the solution was prepared at the power plant in 70° F. water tanks and the temperature decreased to near freezing without precipitation. Purchasing such mixtures means added shipping cost for water.

However, the supplier did not reveal or did not know that the preparation of urea-water solution is a very endothermic reaction. It was discovered after noting thick solid urea deposits at the bottom of 1500 gallon storage tanks in which 50%/50% urea-water solutions had been prepared with ambient, e.g. about 70° F. municipal water. Solutions of 30%/70% urea-water prepared in a 3 gallon bucket revealed that the endothermic energy was about 80 to 90 Btu/lb of urea, and that the water temperature decrease was very rapid in a matter of seconds, (reference 5). Therefore it is disclosed herein that to prepare 50% 50% urea solutions at power plants, the waste steam from the plant be used to heat the water to about 150° F. prior to mixing a 50%/50% solution of water-urea. This will result is a solution at about 70° F. without precipitation.

HIGH-PRESSURE PUMPS SHOULD BE USED TO MIX AND DILUTE HIGH UREA CONCENTRATIONS IN WATER SOLUTIONS WITH HIGH PRESSURE, DILUTION WATER FOR PUMPING THE COMBINED DILUTED SOLUTION FROM GROUND LEVEL STORAGE TANKS TO THE INJECTORS HIGH IN THE UPPER FURNACE SECTION OF THE BOILER.

The tests in Zauderer's $NO_x$ patents were under 1 hour in duration and the reagent solutions and mixtures were prepared manually in 55-gallon drums from which the liquid was injected into the boiler. As the test duration was extended to several hours and then one-shift (nominally 8 hours), a 1500 gallon tank at the ground level of the 50 MW plant was used for this purpose. As the test duration was further extended to one-month of continuous operation, three tanks with 3750 gallon total capacity were used to store the purchased 50%/50% urea-water solution or to prepare the 30%/70% urea-water solution from the purchased 50 lb bags of urea.

In the 50 MW power plant, the on-site storage tanks are on the ground floor and the injection level is in the upper furnace section of the boiler about 100 feet from ground level. FIG. 4 in U.S. Pat. Nos. 6,048,510 and 6,722,295 B2 show a schematic of a delivery system to the injectors. However, practicing the present invention in the 50 MW power plant required significant modifications. Adding the head loss due to gravity, pressure loss in the feed hoses or metal pipes, as well as the air atomizing hydraulic pressure for the injectors necessitated about 100 psi feed pressure at ground level. A high-pressure pump that supplied municipal water to the boiler increased the municipal delivery pressure to over 100 psi.

For the continuous month long $NO_x$ control test the urea injection was mostly accomplished with a Dosimeter in which the 30%/70% or 50%/50% urea-water solution in the 3750 gallon storage tanks was extracted with a peristaltic pump having a nominal two second period and mixed with the 100 psi municipal water at a 20 to 1 or 30 1 ratio. However, by comparing the urea utilization rates with the urea to $NO_x$ mol ratio and the magnitude of the $NO_x$ reduction measured with the Dosimeter feeder with its peristaltic pump it appeared that the urea utilization rate with the Dosimeter was substantially below that obtained in previous short duration tests where the urea was diluted manually in either 55 gallon barrels or in one of the 1500 gallon tanks.

To determine if the lesser urea utilization was due to the pulsation nature of the peristaltic pump, a short duration test with one 55 gallon drum containing a 50%/50% urea-water solution was performed. The urea use and $NO_x$ reduction with the peristaltic pump was compared with pumping from the 55 gallon drum using two ⅓ hp eight-stage pumps, Grainger Model 2P372, in series. The result indicated that the peristaltic pump consumed about twice as much urea as the multistate pump for the same $NO_x$ reduction, in other words, about one-half the urea was wasted. The analysis of the entire summer's urea use, which is incomplete, may modify this result.

In any case, for part of a summer test effort, the Dosimeter was bypassed and a ½ hp, Grainger Model 1P879, twelve stage pump was used to feed the 50%/50% urea-water solution for mixing with the high pressure municipal water line.

[For lime injection tests, the ½ hp pump was replaced with a 1 hp 14 stage pump, Grainger Model 2P280. However, due to the high viscosity of the lime-water mixture even this added hp was insufficient to achieve the desired lime-water injection level.])

The Dosimeter mixing ratios can be adjusted by dialing the dilution ratio in the municipal water line to 5% (i.e. 1 in 20). A plastic rotameter was used to measure and set the urea-water flow rate when using the multi-stage pump in place of the Dosimeter. This change was made at a time when the 50%/50% urea-water mixture was prepared by mixing 50 lb bags of agricultural use urea in the 3750 gallon capacity tanks. However, over the following days it was noted that the flow rate on the rotameter varied widely from its set points. Also, particles were visible in the rotameter. This led to the discovery that a nominal 1 foot thick layer of un-dissolved urea lay on the bottom of the tanks in which the 50%/50% urea-water mixture was prepared, which in turn led to the measurement of the high endothermic action of urea solution as discussed in the previous sub-section. The solution was then reduced to 30% urea in water, and a submersible pump was used to feed the multi-stage pump to prevent particle ingestion into the multi-stage pump, which occurred when the urea-water solution was taken from the bottom drain of the tanks.

The centrifugal multi-stage pumps noted above were used in all the water-urea solution tests at the 50 MW plant, including a 4-month long round the clock tests, and in the water-urea-limestone or lime mixture tests each of one day duration. These functioned satisfactorily. However, their durability for continuous multi-year use, and even multi-month use with mixtures of lime of limestone was not established. Consequently if the pumps have inadequate durability, positive displacement pumps that are widely used to transport solids containing liquids, and that are marketed in various designs and cost ranges, should be used.

MEASUREMENT & CONTROL OF THE FLOW RATES OF UREA-WATER SOLUTIONS, OR LIMESTONE-WATER MIXTURES, OR LIME-WATER MIXTURES

It was observed that the float in rotameters had a tendency to stick when the urea-water flow was decreased. Rotameters could not be used for the opaque lime or limestone mixtures. Therefore for the opaque liquids as well as the water urea solutions, either turbine flow meters, such as, for one example, Omega Company Model No. FTB4605 (0.15 to 22 gpm range) or FTB4507 (0.22 to 22 gpm) range or a Paddle Wheel flow meter, Omega Co. Model FP7001 were used. The paddle wheel has a range from 2 gpm to 460 gpm depending on the pipe size selected with a range of ¾ inch pipe to 3-inch pipe. A digital meter, for example, Omega No. DPF700, allows visual reading and setting the flow with either a manual control valve or a pneumatically controlled valve driven by a signal such as the initial magnitude of $NO_x$ or $SO_2$ flow. In this way the emission level of the boiler can automatically control the reagent flow. An Analog Board, Omega No. DPF700-A was added which was connected to a Voltage Recorder, Omega No. OM-CP-VOLT101, to record the flow at various time intervals, such as 1 minute, which allowed 11 full days of flow data to be recorded. Alternatively, an Omega No. DPF700-232 with a RS-232 Cable Output Board was used with Omega's DASYLab Data Acquisition Software that can record and store the flow continuously on a computer. These recording devices were used for the urea-water, limestone-water, and lime-water tests on the 50 MW boiler. It should be recognized that the present invention is not limited to the equipment disclosed throughout the disclosure herein, and that the present invention contemplates the use of other testing and measurement equipment, throughout.

The fully diluted flow, after mixing the reagent flow with the municipal water, was controlled with a pneumatically controlled valve from a signal derived from the power output of the plant. Since the Dosimeter was limited to 100 psi, a 14 stage, 3 hp pump, Grainger Model No. 2PC38 was inserted at the output of the Dosimeter to provide over 200 psi pressure to deliver the liquid to the injection level at the $6^{th}$ Boiler elevation.

Although the Dosimeter with its peristaltic pump was found to result in excess urea usage, it was used in most of the tests because it required less attention during the one month-round-the-clock urea injection, $NO_x$ control tests from mid July to mid-August.

These $NO_x$ control tests revealed another common problem in experimental Research and development, namely a certain feature or component is installed in the equipment and its existence or purpose is forgotten. Great effort is then expended in attempting to correct an operational problem, when removal of the forgotten component would solve the problem. In the present case, the continuous month long $NO_x$ test effort revealed early in the tests that the total diluted flow should be increased above 15 gpm in order to cool the combustion gases to the temperatures were reduction with urea is effective. However, all attempts to increase the flow failed until at the end of the 4 month test period it was discovered that a DOLE Company type flow restrictor rated at 15 gpm had been installed in the municipal water feed line. Removing the DOLE unit allowed the flow to be increased to 20 gpm in the very last few days of the 4-month test period, and resulted in duplicating the 40% $NO_x$ reductions achieved in previous years short duration tests at full power output. The adverse impact of this $20 flow restricter on the results of the 4-month test effort is described below in the specification where it is noted that it was not possible to achieve 40% $NO_x$ reduction at full power output in the boiler due to this flow restrictor. Compounding this effect was that the summer of the 4-month tests had twice the total Degree Cooling Days, which require more electricity for air conditioners as in previous years and in the following year so that the boiler operated at full power for substantially longer periods during the summer of the 4-month tests, and the summer long $NO_x$ reduction was lower than it would have been had the full power tests been implemented at the higher water flow rates.

UREA/$NO_x$ MOL RATIOS NEEDED TO REDUCE $NO_x$ IN THE 20 MMBTU/HR BOILER AND THE 50 MW BOILER.

Urea contains two NH molecules that reduce $NO_x$. Therefore, the theoretical mol ratio for 100% $NO_x$ reduction is 0.5. As reported in Table 7 of U.S. Pat. No. 6,048,510, the best utilization measured in tests in the 20 MMBtu/hr facility was 49%, i.e. only one-half the urea molecule was used.

In short duration tests on the 50 MW boiler on, in years prior to the 4-month summer tests, the urea over initial untreated $NO_2$ mol ratio was 0.78, or one ton of urea per ton of initial (untreated) $NO_2$. The measured $NO_x$ reduction was 44%, which equaled 2.1 tons of urea per ton of $NO_2$ removed, i.e. about the same 50% urea utilization as in the results in Table 7 of the U.S. patent. This translated to a cost of $NO_x$ removal from $700/ton of $NO_x$ removed, based on a bulk urea price of $330/ton, to almost $1,200 per ton of $NO_x$ removed based on the excessive price of purchased 50%/50% urea-water solutions. In either case that was far less than the $2,500 to $3,000 per ton market price for $NO_x$ emissions in the several years through 2005. It is even competitive with the late 2006 price of $1,000 per ton, which is probably due to unwinding of speculative positions taken in 2005 in $SO_2$ emission trading, and it will likely increase by 2009 when year round $NO_x$ control goes into effect under EPA's CAIR Program. In any case, in continuous use the price of urea in bulk was in the $300 per ton range.

Now the results over the 4-month summer tests required considerably more urea. However, as was noted in above, this was due to the inefficiencies of the Dosimeter, and due to the Dole water flow restrictor, which prevented high $NO_x$ reductions at full boiler load in the 4-month summer tests.

THE IMPACT OF WEATHER ON THE SUMMER TESTS

Another factor that was initially overlooked in evaluating the effectiveness of the 4-month summer continuous $NO_x$ control tests was the weather. The 50 MW power plant operates in a load following mode. An initial comparison of the two month period from June 14 to August 17 a period when urea injection was continuous except for a 2 week period in the first half of July and about another week in early August with no injection. $NO_x$ emissions were 38 tons while at the same two-month period in the cooler prior year the emissions were 37 tons, which incorrectly suggested that the $NO_x$ reduction was totally ineffective.

The reason for this erroneous conclusion is that the test summer was much hotter than in a previous year. In fact the number of Degree Cooling Days (DCD) [Air temperatures above 65° F.] during the 4-month test period was double 398 DCD versus 202 in the previous year. In view of the 50 MW plant's load following to daily demand was 71% at full summer power of 45 MW in the previous year while in the 4-month summer test the following year it was 82%, meant that output was 17% greater than in the previous year. Furthermore, $NO_x$ emissions in lbs per MW, which is a more accurate measure of emission on a plant operating in a load following mode in that the plants Heat Rate is significantly higher at part load than full load, averaged 3.24 lbs/MWH in previous year while in the subsequent 4-month test year it was 2.85, meant that $NO_x$ was 12% lower with urea injection.

However, even that does not explain the difference. Since the plant operated more at near to full power output, the gas temperature in the urea injection zone was measured at near to 2400° F., about 300° F. above the upper end of the temperature where the urea-NOx reaction is fully effective. Furthermore, in most of the summer tests the total water flow was about 10 gpm total and on top of that it was divided through 5 injectors, which meant that there was insufficient injected water flow to cool the gas to the effective reduction range below 2200° F. These results prove that the water flow in the droplet spray pattern is critical to achieving effective $NO_x$ reduction at gas temperatures above 2100° F. to 2200° F.

MEASURING GAS TEMPERATURES IN THE REAGENT INJECTION ZONE

Combustion gas temperatures were measured with Type K thermocouples (TC) inserted into the boiler at the injection level. Designs included the TC wires encapsulated in ceramic by a specialty supplier, and TC wires inserted through stainless steel water cooled pipes at the end of which an open end or closed end ceramic tube held the TC wire junction. In all cases the TC failed either in a matter of hours or several days from either overheating or damage from coal ash particles. It is, therefore, proposed that the TC be inserted and removed into the boiler in a matter of several minutes by an automatically controlled plunger device such as a pneumatic air cylinder. The temperatures can be recorded at regular interval with a data logger such as the Omega Thermocouple recorder Model Number OM-CP-TC4000, whose recording interval can be adjusted for pre-set period with a capacity of recording up to several weeks. Such a record is important in order to adjust the total water dilution rate to the urea-water or lime-water and reduce the local gas temperature to the range where the $NO_x$ and $SO_2$ reduction reactions are effective, namely below 2100° F. to 2200° F.

AMMONIA SLIP

The injection of ammonia or urea either into the boiler at temperatures below the range of about 1700° F. to 1800° F. where the $NO_x$ reducing reaction is ineffective will result in flow of un-reacted ammonia molecules to downstream components and exhaust into the stack. The upper limit of such "ammonia slip" has been set at about 5 parts per million (ppm), and preferably 2 ppm. U.S. Pat. No. 6,048,510 teaches that the primary reason for inserting the injector heads several feet into the boiler is to avoid ammonia slip. In that patent measurements of ammonia slip were 18.7 ppm in the 100 MW boiler urea injection test, and 8.7 ppm and 7.5 ppm at 75% urea utilization and 40% $NO_x$ reduction in the 37 MW boiler.

In a one day test in the year prior to the 4-month test on the 50 MW boiler, the ammonia slip was 2.3 ppm at 40% $NO_x$ reduction and less than 0.02 ppm with about 18% $NO_x$ reduction. In both cases the plant was at near full power output of about 42 MW. This test clearly showed the importance of using $NO_x$/MW, in units of [lb/(hr-MW)], instead of lb/MMBtu because in the 50 MW plant the Heat Rate increases with decreasing power output, as in FIG. 11 showing the MW output in two days in August, and FIG. 12 showing the Heat Rate in Btu/kW-hr for the same two days. As a result the $NO_x$ at low power output with no urea injection was underestimated. With no urea injection, the $NO_x$ was 0.21 lb/MMBtu at 21 MW, while at 42 MW it was 0.28 lb/MMBtu. This would suggest that at low power the $NO_x$ is 25% lower. However, in terms of $NO_x$/MWH, the values were 2.9 and 3.5, respectively, or only 17% lower. So $NO_x$ at low power is relatively higher. Since a power plant sells MW, not Btu's, the MW number is a more accurate measure of emissions.

During the one month long continuous urea injection tests, a set of 18 test runs to measure ammonia slip were performed over 3 days from August $9^{th}$ to $11^{th}$. In all cases ammonia slip was below 0.5 ppmv. The tests covered the range of Low Load (26 MW), Medium Load (35 MW), High Load (43 MW). In addition, the total diluted urea-water injection rate was 8 gpm, 10 gpm, and 12.5 gpm at the three loads respectively. Furthermore, this flow was divided into 5 injectors, 3 on the sidewall and 2 in the corner of the boiler. This means that each injector at even maximum power had only 2.5 gpm. As was clearly demonstrated in previous years tests and in the subsequent end of the 4-month summer test period, the highest $NO_x$ reductions were obtained with 4 to 5 gpm in each injector, especially in the 3 side wall injectors, which cooled the gas in the injector spray to the temperature at which the urea—$NO_x$ reaction is effective, i.e., up to 2100° F. to 2200° F. FIG. 7 shows the measured $NO_x$ reductions at the three conditions used in the ammonia slip tests.

Ammonia Slip Results at Medium-Load (36 MW):

Of the 18 ammonia slip test runs, (each of which was divided into identical groups of the consecutive 1 hour in duration), the first three at 36 MW were conducted with the purchased 50%/50% solution. From the Dosimeter setting, the urea flow was 2.5% of 10 gpm water-urea solution, or 147 lb/hr, which equals 2.45 mols/hr of urea. At this power output in the absence of urea, $NO_x$ averaged 125 lb/hr, 0.28 lb/MMBtu, and 3.5 lb/MWH. The measured $NO_x$ with urea was 100 lb/hr, 0.21 lb/MMBtu, and 2.8 lb/MW, which yielded about 20% $NO_x$ reduction. The mol ratio of urea to the initial untreated $NO_x$ is 2.45/2.72=0.9, which is slightly higher than the 0.78 mol ratio in the test of FIG. 3 that yielded 44% $NO_x$ reduction and required only 2.1 lbs of urea per lb of $NO_x$ removed, or $693 per ton of $NO_x$ removed with bulk urea priced at $330 per ton. In the 36 MW test, the 20% $NO_x$ reduction means that 5.86 lbs of urea would be required per lb of $NO_x$ removed. Even at $330 per ton of urea, the cost of $1,933 per ton of $NO_x$ removed is uneconomical, with emission credits priced at $2,500 to $3,000 per ton.

The difference between the tests is that in this 36 MW test series the 10 gpm was divided into 2 gpm per injector, while in the test shown in FIG. 3 the 14.8 gpm was divided into 3 injectors. This assumption was verified in tests later in August and September in the $2^{nd}$ half of the 4-month summer test, as reported herein.

Finally, despite this excess urea, ammonia slip was under 0.5 ppm, proving that keeping the droplet spray away from the colder gas near the furnace wall suppresses ammonia slip.

Ammonia Slip at High Load (43 MW):

The next three runs of one hour each followed the Mid-Load test in August $9^{th}$. Total liquid flow was 12.5 gpm. From the Dosimeter setting the urea flow was 178 lb/hr, or 2.97 mols/hr. The measured $NO_x$ with urea injection was 130 lb/hr, 0.25 lb/MMBtu and 3 lb/MW, indicating a $NO_x$ reduction of only 14%. The mol ratio of urea per untreated $NO_x$ was 0.9. The weight ratio of urea to $NO_2$ removed was now 8.42, which is not economical, even at $330 per ton of urea. Again this proves the need to cool the gas, and not supply excess urea. However, this test proves that injecting grossly excess urea away from the cooler gas near the wall of the boiler prevents ammonia slip, which was again below 0.5 ppm.

Ammonia Slip at Low Load (26 MW):

A group of three 1-hour runs was performed during the night of August $10^{th}$ from 1 AM to 6 AM. Total liquid flow was now 8 gpm, which from the Dosimeter setting results in 114 lb/hr or 1.9 mols of urea. The measured $NO_x$ at this load averaged 0.16 lb/MMBtu versus about 0.24 lb/MMBtu at this load without urea injection, for a 33% reduction, and 2.16 lb/MW versus about 3.4 lb/MW without urea injection, for a 37% reduction. The mol ratio of the urea to untreated $NO_2$ was about 0.59, and a weight ratio of 0.77. This yields a weight ratio of urea per $NO_x$ removed of 2.08, which at $330 per ton of urea is $686 per ton of $NO_x$ removed. Even at $560 per ton for prepared 50%/50% urea-water solutions, the cost is only $1,120 per ton of $NO_x$ removed versus a market price of $2,500 to $3,000 per ton in the year of the test. At this low power, gas temperature measurements gave values in the range of 1800° F. and therefore no gas cooling is required. Furthermore, here again the ammonia slip was less than 0.5 ppm.

Each of these three sets of test conditions were repeated twice with the same results. Therefore, ammonia slip is not a problem with this $NO_x$ reduction process, and as long as the gas temperature in the injection zone is in the range where the urea reaction with $NO_x$ is effective, the reduction and its cost in reagent is acceptable.

ECONOMICS OF THIS $NO_x$ REDUCTION PROCESS

One erroneous assumption that occurs is that practicing the present $NO_x$ reduction process is costly because the energy consumed in spraying water into the combustion gases increases as more water is injected as the power output increases. As is shown herein and more below, this is incorrect.

The energy consumed in injecting water into the combustion gases is about 2,500 Btu/lb consisting of 1000 Btu/lb enthalpy of vaporization plus 1500 Btu/lb to heat the steam to about 2000° F., of which about 1000 Btu/lb is recovered in the downstream superheater, economizer and air heater, which leaved 1500 Btu/lb so called "lost" energy. At full power in the summer ozone season at the current operating procedure of the 50 MW plant, the maximum output is about 45 MW with 550 MMBtu/hr heat input at its current Heat Rate of 12,200 Btu/kW-hr. A 20 gpm injector spray plus 5 gpm injector tube cooling is required to cool the combustion gases to the urea-$NO_x$ reducing reaction temperature. This consumes 19 MMBtu/hr, equal to 3.5% of the power output or 1.55 MW. In the summer of the 4-month test this represented as much as $620/hr in electricity sales revenue on some hot days when the grid operator paid $400/MWH.

However, this "lost" revenue is "not lost". The boiler's peak stream pressure controls the 50 MW plant's coal feed rate. As the power output decreases due to the water injection, the heat transfer from the cooled combustion gas to the steam pipes decreases and a signal calls for increased coal feed to replace the steam flow. The plant uses a mix of very high ash waste coal, high volatile, high sulfur bituminous coal, and high sulfur petco with an average Higher Heating Value of about 20 million Btu/ton. So 19 MMBtu/hr heat loss from the water injection requires 0.95 ton/hr of coal, and assuming that most costly bituminous coal costs $50/ton, yields $47.50/hr replacement coal cost. To this must be added the cost of urea. Assuming a peak 40% $NO_x$ reduction from 0.3 lb/MMBtu, yields $NO_x$ of 66 lb/hr (i.e. 550×.3.×0.4). It was shown herein that best results to date from low to full power used 2.08 lb urea per lb of $NO_2$, removed. So 40% $NO_x$ reduction requires 137 lb/hr of urea. Even at the high price of $560/ton for prepared 50%/50% urea-water solutions, this costs $ 38/hr. Now at the $3000/ton market price for $NO_x$ credits in the test period, the 66 lb/hr of $NO_x$ have a value of $99. Therefore there is a net profit in reducing $NO_x$ of $13.50/hour (i.e. $99–$47.5–$38), not an increased cost of $620.

Even at a market price of $1,000 per ton of $NO_x$, with all else the same, the "loss" would be only $52.50 (i.e $33–$47.5–$38), not $620. Furthermore, it is possible to replace the "loss" with high ash waste coal at most costing $30/ton, and with bulk urea at $320 per ton, which would reduce the "loss" to $17.40, ($33–$28.5–$21.9), not $620.

However, as shown with calculations herein the operating mode of the 50 MW plant should be restored to 1997 lean combustor operation, which will burn the 15% carbon now lost in the fly ash, and restore the 1997 Heat Rate of 10,200 Btu/kW-hr versus current full load of 12,2000 Btu/kW-hr. This will increase revenue by $1,320/MWH, after deducting the "lost" $620/MWH leaves a profit of $705/MWH.

$SO_2$ REDUCTION WITH LIME OR LIMESTONE

U.S. Pat. No. 6,722,295 describes how $SO_2$ can be reduced in coal fired power plants by mixing lime or finely ground limestone up to 30% by weight with water and injecting the mixture in the upper reaches of a boiler with the same air-atomized droplet injectors that are used for $NO_x$ reduction with urea. U.S. Pat. No. 6,722,295 also teaches that adding urea to the mixture will simultaneously reduce $NO_x$. The patent contains test results that were implemented on a 20 MMBtu/hr, combustor-boiler facility as well as several brief tests with injected lime mixtures that were performed on the 50 MW coal fired power plant years earlier, which yielded very limited $SO_2$ reductions. No further tests were performed at the time because the cost of using lime was almost the same as cost of purchasing $SO_2$ emission credits at less than $200 per ton of $SO_2$ removed.

As the price of $SO_2$ emission credits began to increase, tests with injection of finely pulverized (less than 10 microns mean diameter) limestone were conducted in the post-combustion zone of the 20 MMBtu/hr combustor-boiler facility at gas temperatures of about 2000° F. The fine limestone particles were dispersed in water at about 25% by weight and injected with air atomized injectors as described in the U.S. patent. Peak $SO_2$ reductions as high as 84% were measured at a calcium to sulfur ratio (Ca/S) of 3. Due to the much lower cost of limestone (estimated at $25/ton) versus lime ($85 to $95 per ton), this limestone use was estimated to cost $114 per ton of $SO_2$ removed.

As shown in FIG. 10, from midnight to 4 AM EST finely pulverized limestone was injected in the 50 MW boiler using the same air-atomized injectors as were used to inject urea. The boiler operated at one-half load of 22 MW, where the temperature was measured with an infrared detector at 1800° F. A problem in interpreting results was the lack of samples of the coal being burned. Usually, at 22 MW high ash, very low sulfur coal up to one-half the power output is used. However, at higher loads coal from bins with higher sulfur coal are mixed with the high ash coal. Hence coal from a mixed bin during limestone injection cannot be ruled out. However, the drop in $SO_2$ in FIG. 10 from 2.5 lb/MMBtu to about 1.8 lb/MMBtu at 23:00, as power dropped from 45 MW at 21:00 hours to below 25 MW by 22:00, suggest that the shift to low sulfur coal was completed at 23:00. and restored at 04:40 to 1.75 lb/MMBtu, followed by return to higher sulfur coal of 2.5 lb/MMBtu at 07:00.

FIG. 10 shows that a water-urea solution was injected at 00:20, about 1 hour prior to the limestone injection and during that time the $SO_2$ was reduced by 48% to 1 lb/MMBtu. This reduction may very well have been due to cooling of the gases in the exhaust ducts to below the sulfuric acid dew point of about 350° F., which enables the $SO_2$ to condense as sulfuring acid. The injected limestone would neutralize the sulfur acid. When the limestone was injected no further reduction in $SO_2$ occurred because limestone calcines at a temperature slightly below the 1800° F. gas temperature in the injection zone, and little if any CaO that reacts with $SO_2$, was formed. Hence no further $SO_2$ reduction occurred beyond the exhaust $SO_2$ condensation.

In this 5 hour test, a 24% limestone-3% urea-73% water mixture was prepared in a 1,500 gallon tank equipped with a multiple propellers at the ground level of the plant and pumped with a three stage two hp Grainger pump to a 55 gallon barrel at the injection level with a return hose to the tank below. A float in the 55 gallon barrel controlled the replenishment of the mixture as it was drained by a three hp, single stage pump to feed the 5 injectors in the boiler, two of which were inserted on each of the two side walls at 45° to each other and the $5^{th}$ one at the boiler end wall. A small TV camera allowed monitoring the fluid level in the barrel, and a paddle wheel flow sensor and its diagnostic components transmitted the opaque liquid flow rate to a Notebook computer.

To test the lack of limestone calcinations, a test with lime that calcines at about 1,200° F. was planned. By the beginning of 2005 the price of $SO_2$ emission credits rose to about $700 per ton and by the fall of 2005 it increased to $1,600 per ton. At this high cost, lime is preferred due to its much lower calcining temperature (about 1200° F.) versus limestone's 1650° F. A one day test of lime injection was implemented using the same components as were used for the summer long $NO_x$-urea tests with the addition of 23% lime and 4% urea to water in a 1500 gallon tank. Due to the higher viscosity of the mixture, a 1 hp, 14 stage, Grainger No. 2P280 was used in place of the ½ version 1P879 used for the summer $NO_x$ tests. At 160 psi output, the 1 hp pump was limited to about 6.5 gpm as calculated from the decrease in the liquid level in the 1500 gallon tank. Omega's paddle wheel flow meter was also used to continuously record the flow with Omega's DPF 700 digital meter and OM-CP-VOLT101 data logger. As with the urea tests, this lime/urea/water mixture combined with municipal water for a total flow of 18 gpm which was then boosted to 250 psi with the 3 hp, Grainger 2PC38, 14 stage pump to 5 injectors at the $6^{th}$ boiler level for injection into the boiler.

The $SO_2$ test results are shown in FIG. 8 for the $SO_2$ and FIG. 9 for the $NO_x$. At full load of 45 MW, the coal in use yielded an $SO_2$ of 3 lb/MMBtu (versus the typical 2 lb/MMBtu anticipated). Therefore, the Ca/S mol ratio was only 0.48, too low produce a measurable $SO_2$ reduction. Attempts to increase the lime flow above 6.5 gpm caused the 1 hp pump to overheat and shutdown repeatedly. The plant operates in a load following mode. Therefore, the control room operator requested permission from the regional power grid to lower the power to 28 MW for 1 hour, which would increase the Ca/S to 0.7. This reduced the $SO_2$ to 2.55 lb/MMBtu and when the lime flow was cut, the $SO_2$ increased to 2.9 lb/MMBtu, for a reduction of 12%.

At first glance this would appear to be a poor result. However, this was the first $SO_2$ test with five injectors, Three on the three sidewalls and two in each corner with the injector nozzle inserted at 45°, 3 feet deep. However, this reduction extrapolated to a Ca/S of three, based on the 20 MMBtu/hr combustor-boiler results, and would yield a reduction of 51%. It would require 3.47 tons of lime per initial ton of $SO_2$ or 6.8 tons of lime per ton of $SO_2$ removed, which with lime at about $95 per ton equals $646 per ton of $SO_2$ removed, which compares to the $1,600 per ton of $SO_2$ price for emission credits in late 2005, and is even in the range of the 2006 price of about $500 per ton. However, if the 84% reduction at Ca/S of 3 with limestone that was measured in the 20 MMBtu/hr boiler, were duplicated with lime, it would require 4.13 tons of lime per ton of $SO_2$ removed, and the cost would be $392 per ton of $SO_2$ removed.

As shown in FIG. 9, at the same 28 MW, $NO_x$ was reduced with the urea in the mixture from about 3.25 lb/MW to 2.3 lb/MW or 31% reduction.

Even more important, the problem with the low cost of $25/ton limestone used in the test was that at one-half power plant load the limestone may not have calcined due to the low 1800° F. gas temperature. However at least 70% of the time the boiler runs at full power and with high sulfur coal and $SO_2$ at 2.5 lb/MMBtu, and with 550 MMBtu at 45 MW, that equals 375 lb/hr, or 0.69 tons. Now at Ca/S of 3, 3.23 tons of limestone, costs about $80 per hr. Now if 80% of $SO_2$, is removed that's only $144 per ton removed ($80/[0.69×0.8]). Even at 50% removal that is only $232/ton of $SO_2$ removed, compared to the 2006 depressed $SO_2$ price of $500 per ton, and no capital cost for the equipment.

But, in addition, implementing the change from fuel rich to fuel lean combustion, as described above, will remove the unburned carbon and increase the CaO in the fly ash. This gives the ash a cement like quality and a market value according to DOE (Reference 6) of $40 to $60 per ton. The 50 MW plant produces about 4.2 tons of ash an hour. Adding the CaO of 1.8 tons (i.e. 0.56×3.23) results in 6 tons of ash with 30% of CaO, which is excellent for cement type use, and with values from $240 to $360 per hour from ash. Using a $300/hour average, the cost to reduce $SO_2$ with lime of $392 per hour is now only $92 per hour plus $276 per hour from $SO_2$ market sale (i.e $500×0.69 tons×80%). for $366 per hr revenue. With limestone, the revenue from ash sales with $SO_2$ at 80% removal at a cost of $144/hr is now a gross revenue of ($300−$144)=$156/hr plus $276 from $SO_2$ market sales, which equals $432 per hour, of gross revenue, namely a profit of about $3.5 million a year.

Therefore, practicing the inventions with combined $NO_x$ and $SO_2$ reduction process is a powerful means of reducing these pollutants at low capital cost and high profit.

USING SUBJECT SNCR $NO_x$ PATENTS AND INVENTIONS TO REDUCE $SO_2$ AND $CO_2$.

This section is based on Provisional Application No. 60/786,372, filed Mar. 28, 2006, which by reference is fully incorporated herein. A reason why the present invention is a greatly improved emission control process over known processes is that it offers methods and processes for sharply reducing the major pollutants from coal combustion, namely $NO_x$, $SO_2$, and even $CO_2$ with minimal capital cost. The reason being that if the plant operates in compliance with $NO_x$ emission standards, it requires only reducing fuel rich combustion that increases $NO_x$ to a degree that SNCR with or without reburn can restore. Or, if the plant is not in compliance, then SNCR with or without reburn and with minimal fuel rich combustion can bring $NO_x$ emissions into compliance. This is a key consideration in the U.S. where according to DOE 60% of U.S. power plants with a total installed capacity of 188,000 MW are rated at less that 300 MW and are over 15 years old. In 2005, prorated to this 60% capacity, these plants emitted 6.8 million tons of $SO_2$ and 2.6 million tons of $NO_x$. (EIA/DOE Website). Controlling these pollutants is not due to the lack of suitable processes. One can remove over 90% of $NO_x$ through Selective Catalytic Reduction (SCR) and over 90% of $SO_2$ with stack scrubbers. The problem is that their costs are in the hundreds of dollars per kW, which is not a cost effective solution for old, or even new, coal fired power plants.

The following discloses methods by which these pollutants can be reduced at low capital cost by using a total systems approach, some of which was already disclosed earlier in this application. The 50 MW coal fired power plant discussed herein is a good example of the failure to undertake a systems approach in that in trying to meet emission regulation the plant's total emissions increased and the plant efficiency decreased. The plant was designed to fire very high (20% to 30%) ash coals, which required excess air in the boiler's primary burner zone. Consequently, to meet increasingly stringent $NO_x$ emissions in the late 1990's, the high ash coal was reduced to provide only about 50% of the full 50 MW load. A high volatile, bituminous, higher sulfur coal was used to achieve efficient combustion up to full load because under fuel rich conditions the oxygen is depleted and the hundreds of times slower $CO_2$-solid carbon and $H_2O$-solid carbon reactions that remain to burn the fixed carbon leaves over substantial unburned carbon in the combustion zone. To offset this, especially in the high solid carbon low volatile anthracite or low volatile bituminous coal, high volatile bituminous or sub-bituminous coals are required because the reactions proceed much faster with gaseous components in the coal. Unfortunately this results in much higher sulfur emissions from the volatile matter. After primary combustion, the fuel-rich gases pass through over fire air to complete combustion, but this nevertheless leaves unburned carbon to about 15% in the ash in the 50 MW plant. Consequently $NO_x$ was cut in about one-half from the 1997 rate so that by 2005 $SO_2$ doubled.

This procedure was acceptable until late 2004 and 2005 when the price of $SO_2$ emission credits exploded to $600 per ton and then to $1600/ton, and about one-third of the plant's costs were expended on purchasing $SO_2$ emission credits. $SO_2$ emissions can be reduced by U.S. Pat. No. 6,722,295, which can be used in combination with the present invention and which is incorporated by reference in its entirety. However, depending on the price of $NO_x$ and $SO_2$ emission credits, there are instances as disclosed herein where the combined $SO_2/NO_x$ steps may not always be required.

An EPA Web site (http://www.epa.gov/airmarkets/emissions/prelimarp/index.html) lists $NO_x$, $SO_2$, $CO_2$ emissions, power output, heat input, and hours of operation from every power plant in the USA for intervals ranging from hourly to annually since about 1995. This is an important resource because it allows one who practices this invention to find power plants that meet the criteria of using the emission reduction processes now disclosed in which $NO_x$ emissions are allowed to increase in the primary combustion zone and then decrease downstream using Zauderer's SNCR and Reburn processes to return or even lower $NO_x$ and reduce $SO_2$ by replacing high volatile, high sulfur coal with a low volatile, low sulfur coal, which will burn more efficiently in the less fuel rich primary combustion zone with the 50 MW power plant as an example on how to implement this.

FIG. 13 and FIG. 14 were derived from data on the 50 MW plant taken from the EPA site which show in FIG. 13 that this plant reduced its $NO_x$ from 333 tons (0.47 lb/MMBtu) in 1997 to 165 tons (0.25 lb/MMBtu) in 2005, a 168 ton (50%) reduction in the 5-month Ozone season. $SO_2$ increased from 2,487 tons (1.35 lb/MMBtu) in 1997 to 4,531 tons 2.78 lb/MMBtu) in 2005, a 2044 ton (82%) increase per 12 months. The dramatic changes are shown as percentage from 1996 in FIG. 14. Incredibly $SO_2$ increased by 222% by 2005 while $NO_x$ decreased by only one-third. Also, FIG. 15 shows that the plant efficiency decreased from 34% in 1997 to 27.8% in 2005, an 18% decrease, which means that $CO_2$ emissions increased by 22%. So this invention discloses operating the primary combustor with low volatile, low sulfur coal at less fuel rich conditions and allowing combustion efficiency and $NO_x$ to increase, then use SNCR, with or without Reburn to reduce $NO_x$, while $SO_2$ and $CO_2$ will automatically decrease Note that the three figures clearly show that the changes occurred when the power plant further reduced $NO_x$ in 1998. EPA provides no data prior to 1996, but since this boiler can produce 1 lb/MMBtu of $NO_x$, there must have been other low $NO_x$ changes before 1996.

A number of other coal fired power plants were found at the Web site that exhibit this pattern of increasing $SO_2$ as $NO_x$ was reduced by fuel rich combustion. This is especially the case after 2003 when EPA tightened $NO_x$ emissions to 0.15 lb/MMBtu. In many cases $SO_2$ increased presumably due to more high volatile, high sulfur coal.

So we have here an incredibly unrecognized counterproductive "squeezing the balloon" effect. To meet $NO_x$ emission reductions, $SO_2$ emissions and even more incredible, $CO_2$, "a global warming gas", emissions are increased. Now SCR and $SO_2$ scrubbers would alleviate this dichotomy in that operation of near stoichiometric conditions in the primary boiler furnace zone would be possible with $NO_x$ removed in the SCR system. However, the capital cost of these two systems is prohibitive, especially for the smaller and older power plants, and it makes no sense to use them to lower $CO_2$ emissions.

To quantify the economic cost of the current $NO_x$ reduction approach of using low $NO_x$ burners or staged combustion, the difference in $SO_2$ and $NO_x$ emissions between 1997 and 2005 were calculated using the 2005 or 2006 costs of emission credits for the 50 MW power plant. Note that the 2005 output was 265,588 MW while the 1997 output was 366,000 MW, or 18% more due to the higher efficiency of 34% in 1997 versus 27.8% in 2005. The cost of the different coals can be readily calculated by using market prices for 2% sulfur, low ash coal, which powers the upper one-half of the boiler power output, and the 30% ash coal with 1% sulfur coal for the first 50% of power output Other costs are as follows using 2005 or 2006 prices:
1) $NO_x$ credits are purchased @ $2,500/ton, cost (884−451)=433 tons×$2,500=$1,082,500.
2) Urea @ $400/ton. 2 tons of urea remove one ton of $NO_x$ in the 50 MW boiler using SNCR $NO_x$ Process in U.S. Pat. No. 6,048,510, which is incorporated by reference in its entirety. Therefore, to recover the $NO_x$ increase caused by operating with less fuel rich coals will cost 433 tons (12 month of $NO_x$ as in 1997)×2 (for urea)×$400/ton=$346,000. This process can reduce $NO_x$ by 44%, so the SNCR process can return the $NO_x$ emissions to 0.27 lb/MMBtu from the new higher $NO_x$ operation at the 1997 emission rate of 0.46 lb/MMBtu.
3) $SO_2$ emission credit: (4,531−2467)×$1,600 per ton of $SO_2$=$3,302,400 with 2005 $SO_2$ price.
4) $SO_2$ emission credit: (4,531−2467)×$500 per ton of $SO_2$=$1,031,000 with 2006 $SO_2$ price Therefore, by shifting 100% back to the high ash, low sulfur coal will save at least $3 million in $SO_2$ emission credits (i.e. $3,302,400 minus $346,000).

The saving is actually greater as the boiler will operate on lower cost coal, and at higher efficiency, adding the Reburn process (U.S. Pat. No. 6,453,830 B1, which is incorporated by reference in its entirety herein (as are all patents cited herein), will provide an additional near 50% $NO_x$ reduction. Also, less fuel rich operation at the primary burners will substantially reduce unburned carbon losses. $CO_2$ emission credits trade and can be sold in Europe with a 2006 and 2007 market price of $11.77 per ton. In 2005, the 50 MW plant emitted 1.32 tons of $CO_2$ per MWH, while in 1997 it was 1.13 tons/MWH, a 14% reduction. Note its 2005 the power output was 265,000 MWH. So the revenue with the present invention would be $581,000 (i.e. 0.19 t/MW×265,000 MWH×$11.77). for sale of this $CO_2$ credit. Assuming a 10% $CO_2$ reduction of U.S. coal power plant $CO_2$, yields 240 million tons valued at $2.8 billion.

Also, shifting to 100% high ash, low volatile waste coal, would reduce the cost for 50% of the estimated 163,000 tons of coal burned in 2005. Assuming this coal costs $30/ton versus $50 per ton for the high volatile, high sulfur coal, would save $1,630,000 (i.e. [$50−30]×163,000/2)

The above added revenue of million of dollars are far greater than the cost of urea and lost power from water injection in the 2000° F. combustion gases which are estimated at under $500,000. This is in addition to the $SO_2$ reduction from lime or limestone as discussed in herein above.

An alternate method of using the Reburn $NO_x$ process (U.S. Pat. No. 6,453,830, Sep. 24, 2002), which by reference is incorporated herein in its entirety. is to use reburn to drive the urea injection zone to slightly fuel rich conditions. It will then not be necessary to cool the gas because under fuel rich conditions, the urea-$NO_x$ reaction remains effective at higher gas temperatures than the 2100° F. or so upper limit of the SNCR process.

In conclusion, an aspect of this invention is that practicing this invention will remove at least 14% of $CO_2$ emissions that resulted from shifting from little $NO_x$ reduction to high $NO_x$ reduction.

A SYSTEMS APPROACH USING MULTI-DIMENSIONAL DEGREES OF FREEDOM, TO CHANGE ONE OF MORE FACTORS LEADS TO CHANGES IN THE REMAINING ONES AND REDUCES TOTAL EMISSIONS AND IMPROVES EFFICIENCY OF COAL POWER PLANTS.

In the following, examples are given on how a multi-dimensional degrees of freedom method, defined as a change in one or more operational factors leads to changes in the remaining ones, can be practiced to optimize the technical and economic performance of a coal fired power plant. The 50 MW power plant is again used as an example. It operates in a load following mode controlled by the Middle Atlantic State PJM electric grid. This plant's boiler burns:

low volatile anthracite with low (<10%) ash, low (<1%) sulfur, with a Higher Heating Value [HHV] of over 13,000 Btu/lb;

anthracite culm with high (20% to 30%) ash, low (<1%) sulfur, HHV of 8,800 to 10,000 Btu/lb;

bituminous coals, nominal (2%) sulfur, low (~10%) ash, HHV~12,000 Btu/lb; and high (3% to 7%) sulfur, petroleum coke, HHV=14,000 to 15,000 Btu/lb.

These fuels are stored in separate bins, containing either culm alone, which is used to fire up to one-half load (20 MW to 25 MW), generally in nighttime operation, and mixtures of the low sulfur and HHV and high sulfur and HHV coal as well as some high sulfur petroleum coke, which are used during daytime operation.

FIG. 11 shows the power output from midnight of September 27-28 through 10:00 AM. of the $29^{th}$ From midnight to 4:30 AM, output was about 22 MW. It then increased slowly to 43 MW, which is about full load in the summer, by 7:00 AM. While on average power remains at full load all day until 20:00 hours, there are considerable fluctuations in power during the day as the grid increases or decreases its demand for power.

FIG. 12 shows the inverse of overall efficiency, plotted as the Heat Rate in Btu/kW-hr, that is caused by this rapid load following dictated by PJM Grid. At half load, 22 MW, the Heat Rate is 14,300 Btu/kW-hr while at full load, 43 MW, it is 11,700 to 12,000 Btu/kW-hr, an 18% loss in efficiency at low load. The inefficiencies are much worse when one compares the Heat Rate with levels achieved in 1997 of 10,000 Btu/kW-hr, a 17% reduction in efficiency from 1997 at full load, and possibly as much as 30% at part load. The current efficiency loss at half load is caused by too much excess air and by poor combustion of the difficult to burn culm. It is also caused by an amount unknown to this inventor by fixed parasitic losses that increase as a percentage of power output as the output decreases. In 1997, primary combustion was less fuel rich and the $NO_x$ was 0.47 lb/MMBtu, or about double the current average of 0.27 lb/MMBtu obtained under greater fuel rich combustion.

One solution disclosed herein is to operate the main burners little or no reducing conditions, or even minimal excess air, and then use SNCR and/or reburn to reduce $NO_x$. Another solution disclosed herein is to bleed excess air from the inlet combustion air ducts during part load operation to bring the primary burner flame zone toward near stoichiometric conditions in order to achieve a higher flame temperature. This would achieve more efficient combustion, SNCR and Reburn would then be used to bring $NO_x$ back to emission compliance.

One problem with multiple coal burners that are used in all large boilers is the near impossibility of equally dividing the coal feed to all burners. This is also the case in this 50 MW power plant. This non-uniform coal feeding results in combustion inefficiencies due to local variations in stoichiometry. It is now disclosed that instead of trying to divide the coal equally to each burner, which is almost impossible, an $O_2$ sensor be inserted in each primary burner combustion zone and a separate lance be inserted into the burner zone along the design of FIGS. 2F and 2G in U.S. Pat. No. 6,453,830 to provide additional coal to bring each burner's heat input into balance.

Another economic improvement is to increase the quantity of low sulfur, high ash culm or coal mine waste coal when operating above the 50% load in the boiler. If the mills are limited in grinding capacity, a low cost solution would be to use low cost hammer mills or coal crushers to grind the additional coal to coarser size distribution, such as 70% minus 100 mesh, than conventional pulverized coal of 70% to 80% minus 200 mesh. The gas temperature in the primary burners will provide the necessary conditions to burn the coarser, high ash coal.

Another operating consideration in load following operation, as used in the 50 MW plant, is that the price paid to the power plant by the grid varies many times even hourly. On hot summer days power surged to $400 per MW. In that case, the 1 to 2 MW lost from the water-urea spray nozzles evaporation can cost up to $800/MW, which may exceed the cost of $NO_x$ emission credits. In that case the SNCR urea-water injection lances should be retracted automatically from the boiler combustion zone, and re-inserted when electric prices recede to levels below $NO_x$ emission credits. As was already noted in the above, the cost of spraying into the boiler an aqueous solutions of urea is not the power lost due to cooling of the gas, but the cost of the added coal needed to restore the lost power as well as the cost of urea, which are substantially less than the power cost.

An aspect of this sub-section is to automate the plant's operation through diagnostics that submit standard operating power plant variables, such as fuel type and feed rate, power output, as well as emissions of $NO_x$ and $SO_2$ to a central computer, with software that computes the most cost effective mode of operating at power levels imposed by the electric grid. Signals are then sent to adjust operating conditions to obtain the maximum revenue. An aspect of the present invention is to incorporate all financial factors in selecting operating conditions. Just as electricity prices fluctuate hourly, other variables such as emission credits should also fluctuate. Therefore, a power plant having the ability to change the most operating variables to optimize, especially emissions, will have a significant economic advantage over power plants that fail to integrate emissions in their operating scheme.

The example disclosed in this invention is to increase $NO_x$ in the primary burner zone in order to improve operating efficiency and using SNCR and reburn to return to compliance. It should be also understood that this invention optimizes the efficiency and emission reductions, and maximizes profitability of power plants. Consequently there may be instances where it is more cost effective to bring one or more pollutants into emission compliance by purchasing emission credits for the pollutants in order to bring the other pollutants into compliance. For example, if Selective Non-Catalytic Reduction (SNCR) process will bring $NO_x$ into near compliance, it may be cheaper to purchase $NO_x$ emission credits to bring the remaining $NO_x$ into compliance in order to allow efficient combustion of lower sulfur coal at fuel lean conditions, which reduces $SO_2$ and $CO_2$ and increases efficiency.

It should be understood by those of skill in the art that is not the method by which current power plants operate. If they did, both profitability and emissions control would improve profitability.

It is understood that the results shown in this invention are only meant to convey the procedure to be followed in practicing the use of Selective Non-Catalytic Reduction and if needed Reburn, to reduce the $NO_x$ that forms during the deliberate increase of $NO_x$ formation in order to facilitate efficient near fuel lean combustion that will reduce $CO_2$ emissions and facilitate the reduction of $SO_2$ by means of low sulfur and low volatility coals and by means of injection of lime, limestone, and urea all in slurry form, with sufficient water concentration to obtain the gas temperatures at which the $NO_x$ and $SO_2$ reduction reactions are effective. As such, the above examples are only meant to convey the approach to be taken to optimize the operation of the power plant, and should not be considered limiting any aspect of the present invention While the invention has been described in terms of its preferred embodiments, those skilled in the art will recognize that the invention can be practiced with modifications within the spirit and scope of the appended claims

What is claimed is:

1. A method for complete combustion of a carbonaceous fuel, low volatile matter, low sulfur coal, in a primary combustion zone of a boiler or furnace operating at about 3000° F. gas temperature and near to or at stoichiometric condition of unity in order to increase combustion efficiency and nitrogen oxide, $NO_x$, concentrations, while reducing carbon dioxide, $CO_2$, and sulfur dioxide, $SO_2$, concentrations in the primary combustion zone below levels attainable with more fuel rich combustion and higher sulfur coal, comprising:
   identifying a post-primary combustion zone within the boiler or furnace having gas temperatures between about 1700° F. to 2500° F.;
   injecting an aqueous urea or ammonia solution as dispersed air atomized droplets of varying diameters across a planar spray pattern perpendicular to gas flow direction for reducing $NO_x$ to at least 0.3 lb/MMBtu;
   if required to augment the aqueous urea or ammonia solution to achieve the reduction of the $NO_x$, injecting in the post-primary combustion zone, a solid or liquid carbonaceous fuel to convert by reburn gases to local fuel rich conditions, followed by injection of additional air into a post reburn combustion zone to return the gases to excess air conditions; and
   adjusting water concentration in the aqueous urea or ammonia solution to levels that are high enough to cool the gases to about 2100° F. to 2200° F. or below in order to enable urea or ammonia-$NO_x$ reaction to function at temperatures for effective post combustion $NO_x$ reducing reactions.

2. The method in accordance with claim 1, wherein the aqueous urea or ammonia solution is mixed with lime or limestone particles that are less than about 10 microns in diameter and which are injected as air atomized droplets of varying size with injectors into the post-combustion zone to further reduce $SO_2$.

3. The method in accordance with claim 2, wherein a calcium to sulfur mol ratio is increased to as much as 3 to maximize the $SO_2$ reduction, and to increase calcium oxide, CaO, concentration in. fly ash entrained in combustion gases flowing through the boiler or furnace to exit into an ash collection location, wherein the CaO in the CaO fly ash mixture is between about 20% and 40% of mixture weight.

4. The method in accordance with claim 1, further comprising providing water flow to reduce gas temperature to a range of about 1700° F. to 2100° F. at which $NO_x$ and $SO_2$ reducing reactions are effective, and using sufficient injectors so that a total planar droplet spray emanating from the injectors covers at least most of the $NO_x$ and $SO_2$ reducing gas temperature zone.

5. The method in accordance with claim 1, wherein reburn fuel to reduce $NO_x$ in a gas temperature zone between about 1700° F. and 2500° F. is injected in addition to the aqueous urea or ammonia solution, and wherein a predetermined number of injectors are used to cover an entire reburn combustion zone.

6. The method in accordance with claim 2, further comprising using only lime when combustion gas temperature in a lime or limestone injection zone is below about 2000° F.

7. The method in accordance with claim 1, wherein optimization of the $NO_x$ reduction is given priority to minimize $NO_x$ in pounds per megawatt over pounds per million Btu.

8. The method in accordance with claim 1, wherein when the urea is dry granular bulk form, it is prepared by solution in storage tanks, and the solution does not exceed about 30% if the water is at ambient temperature or about 50% when the water is pre-heated to about 150° F., with low grade water or steam from the boiler to prevent solid urea precipitation in the highly endothermic urea-water reaction.

9. The method in accordance with claim 2, wherein the lime or limestone that comprises particles less than 10 micrometers in diameter is prepared in a storage tank in a concentration that does not exceed about 30% by weight and the urea concentration in a water-lime or water-limestone mixture does not exceed relative mol ratios for effective reduction of $SO_2$ and of $NO_x$.

10. The method in accordance with claim 8, wherein high concentration aqueous solutions of the urea or ammonia are pumped with multi-stage centrifugal pumps and diluted with water at ground level and pumped to injectors inserted into walls of the boiler or furnace at elevations in a range of about 100 feet by multi-stage centrifugal pumps.

11. The method in accordance with claim 9, wherein high concentration aqueous solutions of the urea and lime or limestone are pumped with, multi-stage centrifugal pumps and diluted with water at ground level and pumped to injectors inserted into walls of the boiler or furnace at elevations in a range of about 100 feet by the multi-stage centrifugal pumps, and insertion and removal of the injectors from inside furnace gases are preceded with water only flushing to prevent the lime or limestone from drying and blocking injector air or water passages.

12. The method in accordance with claim 4, wherein a flow rate in each injector controls a required flow rate of the aqueous urea or ammonia solution needed to cool the gases in a $NO_x$ reducing injection zone.

13. The method in accordance with claim 1, wherein an injection of water dilution flow rate into the boiler or furnace lowers a power output, and additional coal or other fuel is delivered to primary combustors to restore power output with fuel selection made with a lowest cost fuel to minimize economic cost of emission reduction.

14. The method in accordance with claim 1, wherein injectors are automatically removed from the furnace or boiler during periods when a price of produced energy or electricity overrides an economic benefit from $NO_x$, $SO_2$ and $CO_2$ reductions.

15. The method in accordance with claim 1, wherein when existing fuel delivery systems have insufficient capacity to replace power loss due to $NO_x$ or $SO_2$ processes, auxiliary low cost coal crushers and burners with capacity to process replacement fuel are used, and in case combustion efficiency and $NO_x$ and $SO_2$ productions are adversely affected by uneven fuel distribution, additional burners are used to even heat input per burner by controls including $O_2$ sensors to optimize burner operation.

16. The method in accordance with claim 1, wherein under no circumstances are injector heads from which $NO_x$ reducing urea or ammonia reaction are inserted at gas temperatures where a reducing reaction is effective to be placed at locations where the gas temperature is below a lowest level where the reaction is effective to prevent ammonia slip.

17. The method in accordance with claim 1, further comprising removing injectors when utility capacity and electricity prices are above predetermined levels, and reinserting the injectors when utility capacity and electricity prices return to or below the predetermined levels.

18. The method in accordance with claim 1, further comprising inserting thermocouples for predetermined periods of time to measure temperature in the boiler or furnace, and withdrawing the thermocouples after the predetermined amount of time to prevent rapid destruction in an ash and slag laden hot gas environment of the boiler or furnace.

19. The method in accordance with claim 1, further comprising using infrared detectors for temperature measurement of the boiler or furnace and correcting readings therefrom for a level of water injected by the injectors.

20. The method in accordance with claim 1, wherein evaluating cost effectiveness of $SO_2$ and $NO_x$ and $CO_2$ reduction processes includes considering factors that impact power plant performance and efficiency, and further comprising by returning the boiler or furnace to its pre-fuel rich combustion $NO_x$ control operation by modifying or removing low $NO_x$ burners and overfire air and increasing $NO_x$ emissions to pre-regulation levels results in efficient combustion with low cost, low volatile, low sulfur coals with no unburned carbon loss, and using the steps of claim 1 to restore higher $NO_x$ to current regulation level.

21. The method in accordance with claim 20, wherein EPA emission data for U.S. power plants and furnaces are reported regularly to seek out facilities that benefit by using the steps of claim 1 to restore boiler furnace operation to pre-emission regulation levels.

22. The method of claim 1, further comprising injecting the aqueous urea or ammonia solution, with or without reburn in the solution injection zone, reduces $NO_x$ to at least 0.15 lb/MMBtu.

23. The method of claim 11, wherein positive displacement pumps are used in addition or instead of the multi-stage centrifugal pumps.

24. The method of claim 1, wherein $NO_x$ emission credits are purchased for a difference between a $NO_x$ emission level resulting from the urea or ammonia injection and the $NO_x$ level required for full regulatory emission compliance.

25. The method of claim 3, wherein an ash-calcium oxide mixture is a cementitious marketable product.

26. A method, comprising:
  identifying a post-primary combustion zone within the boiler or furnace;
  injecting an aqueous urea or ammonia solution as dispersed air atomized droplets of varying diameters across a planar spray pattern perpendicular to gas flow direction for reducing $NO_x$;
  injecting, a solid or liquid carbonaceous fuel to convert by reburn gases to local fuel rich conditions, followed by injection of air into a post combustion zone to return gases to excess air conditions; and
  adjusting water concentration in the aqueous urea or ammonia solution to levels that are high enough to cool the gases in order to enable urea or ammonia-$NO_x$ reaction to function at temperatures for effective post combustion $NO_x$ reducing reactions.

27. The method of claim 26, further comprising at least one of:
  using low volatile, low sulfur coal to reduce $SO_2$ emissions;
  injecting lime or limestone to further reduce $SO_2$ emissions;

injecting sufficient limestone to increase a concentration of calcium oxide in emitted coal fly ash to increase its concentration to 20% or more by weight of the ash-limestone mixture;

selling excess $SO_2$, $NO_x$, and $CO_2$ reductions beyond levels needed for regulatory compliance;

selling cementitious ash-CaO mixture; and operating the power plant in load following power output or fixed power output.

28. The method of claim 23, wherein the positive displacement-pumps are used in addition or instead of the multi-stage centrifugal pumps.

29. The method of claim 27, wherein the fixed power output is a fixed continuous power output.

30. The method of claim 1, wherein if the aqueous urea or ammonia solution does not result in the reduction of the $NO_x$ to required levels, then inject in the post-primary combustion zone, a solid or liquid or gaseous carbonaceous fuel to convert by reburn gases to local fuel rich conditions, followed by injection of additional air into a post reburn combustion zone to return the gases to excess air conditions.

* * * * *